United States Patent
Vora et al.

(10) Patent No.: US 9,979,689 B2
(45) Date of Patent: May 22, 2018

(54) AUTHORING TOOL FOR CREATING NEW ELECTRONIC POSTS

(71) Applicant: salesforce.com, inc., San Francisco, CA (US)

(72) Inventors: Darshil Vipul Vora, San Francisco, CA (US); Mrudula Kodali, San Francisco, CA (US); Jamie No, Mill Creek, WA (US)

(73) Assignee: SALESFORCE.COM, INC., San Francisco, CA (US)

( * ) Notice: Subject to any disclaimer, the term of this patent is extended or adjusted under 35 U.S.C. 154(b) by 97 days.

(21) Appl. No.: 14/754,633

(22) Filed: Jun. 29, 2015

(65) Prior Publication Data
US 2016/0380952 A1 Dec. 29, 2016

(51) Int. Cl.
*G06F 15/173* (2006.01)
*H04L 12/58* (2006.01)

(52) U.S. Cl.
CPC .............. *H04L 51/32* (2013.01); *H04L 51/10* (2013.01); *H04L 51/28* (2013.01); *H04L 51/16* (2013.01)

(58) Field of Classification Search
CPC ......... H04L 51/10; H04L 51/16; H04L 51/28; H04L 51/32
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |

(Continued)

OTHER PUBLICATIONS

"Google Plus Users", Google+Ripples; Oct. 31, 2011; 3 pages.

*Primary Examiner* — Scott B Christensen
(74) *Attorney, Agent, or Firm* — Schwabe Williamson & Wyatt

(57) ABSTRACT

A database system operates a feed system and communicates with different remote computing devices associated with different users. The database system may display feed items from the feed system on the remote computing devices and enable users to author new posts to the feed system. An authoring tool supports creation of new posts, and provides transparency as to which users will have access to the post. The authoring tool supports managing intended recipients, including users, groups, topics, files, and other entities. The authoring tool creates, and shows to the author, an automatic summary of recipients before the post is added to the feed system.

20 Claims, 19 Drawing Sheets

(56) References Cited

U.S. PATENT DOCUMENTS

| | | |
|---|---|---|
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,762,462 B1 * | 6/2014 | Duddu ............... H04L 51/18 709/204 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100183 A1 * | 4/2009 | Lam ..................... G06F 15/16 709/229 |
| 2009/0100342 A1 | 4/2009 | Jakobson |
| 2009/0177744 A1 | 7/2009 | Marlow et al. |
| 2011/0218958 A1 | 9/2011 | Warshavsky |

(56) References Cited

U.S. PATENT DOCUMENTS

| | | |
|---|---|---|
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0101149 A1* | 4/2014 | Winters ............ G06F 17/30345 707/736 |
| 2014/0359537 A1 | 12/2014 | Jackobson et al. |

\* cited by examiner

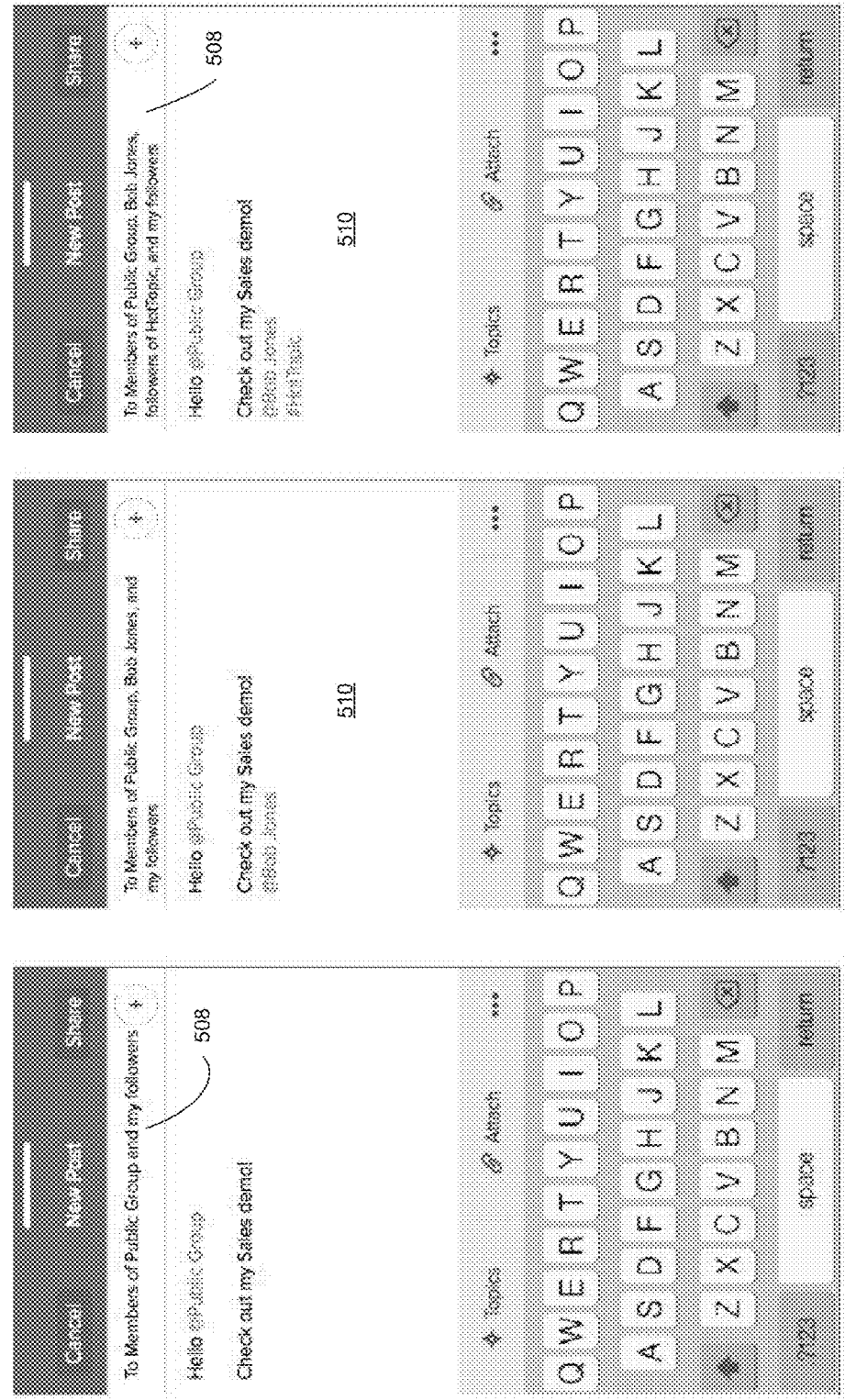

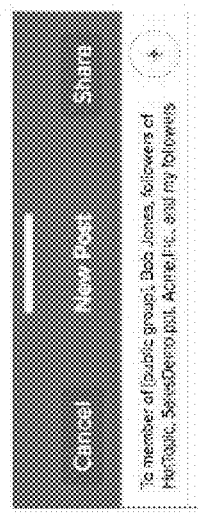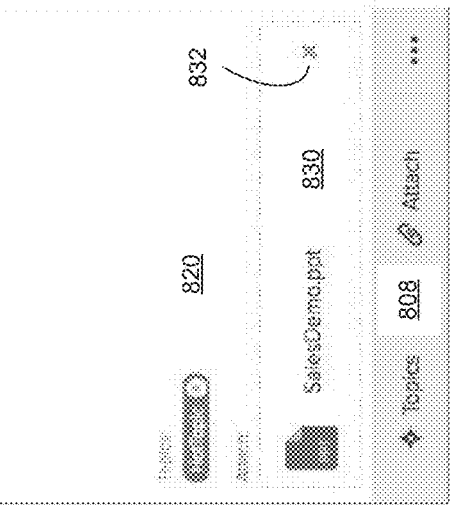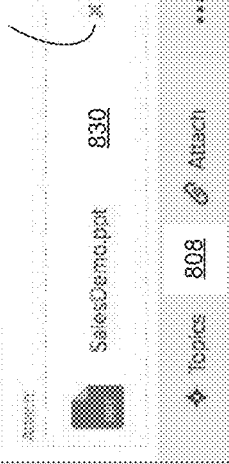
FIG. 8A
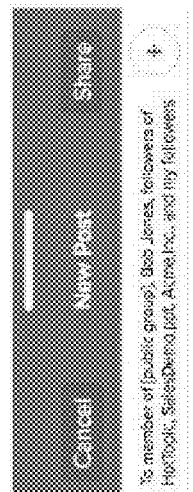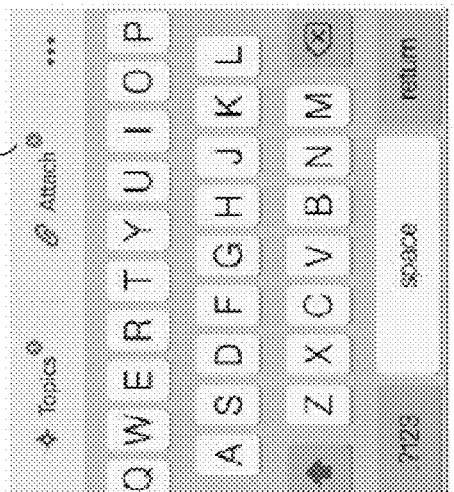
FIG. 8B
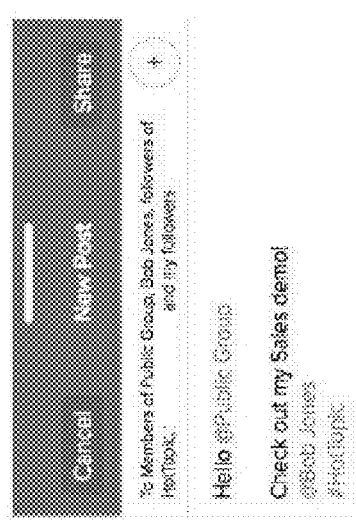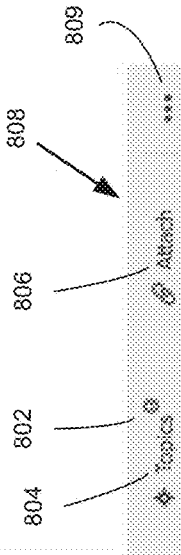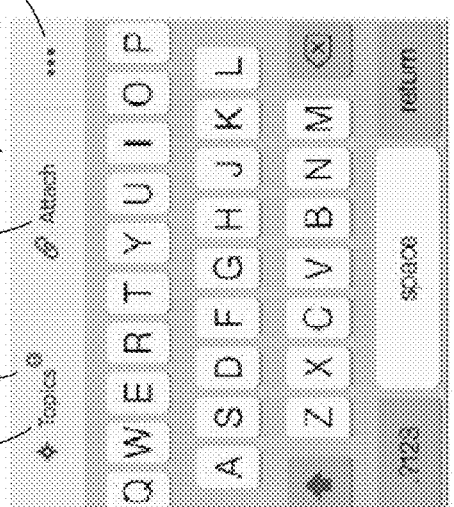
FIG. 8C

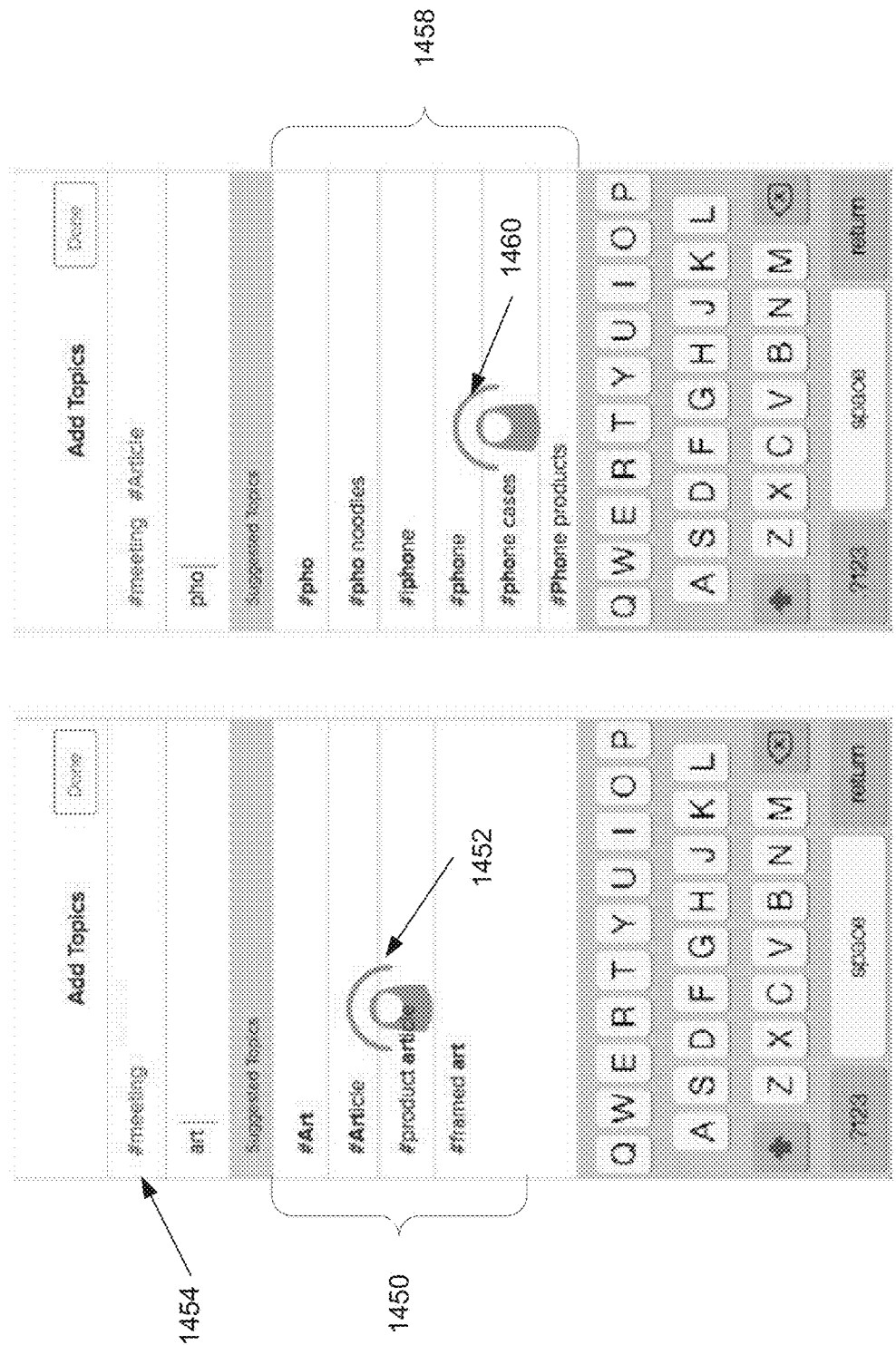

AUTHORING TOOL FOR CREATING NEW ELECTRONIC POSTS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to authoring and posting electronic items in a network coupled to a database system or service.

BACKGROUND

"Cloud computing" services provide shared resources, software, and information to computers and other devices upon request or on demand. Cloud computing typically involves the over-the-Internet provision of dynamically-scalable and often virtualized resources. Technical details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 3 shows an example of a group feed display on a group profile page according to some implementations.

FIG. 4A shows an example of a record feed display on a record profile page according to some implementations.

FIGS. 7A-7C further illustrate an example of a user interface and adding additional recipients during construction of a post utilizing the authoring tool of FIGS. 5A-5B according to some implementations.

FIGS. 8A-8C further illustrate an example of a user interface and additional features of the authoring tool of FIGS. 5A-5B according to some implementations.

FIGS. 14A-14B are user interface screen displays illustrating Add Topics operations of an authoring tool according to some implementations.

DETAILED DESCRIPTION

Figure 1A:
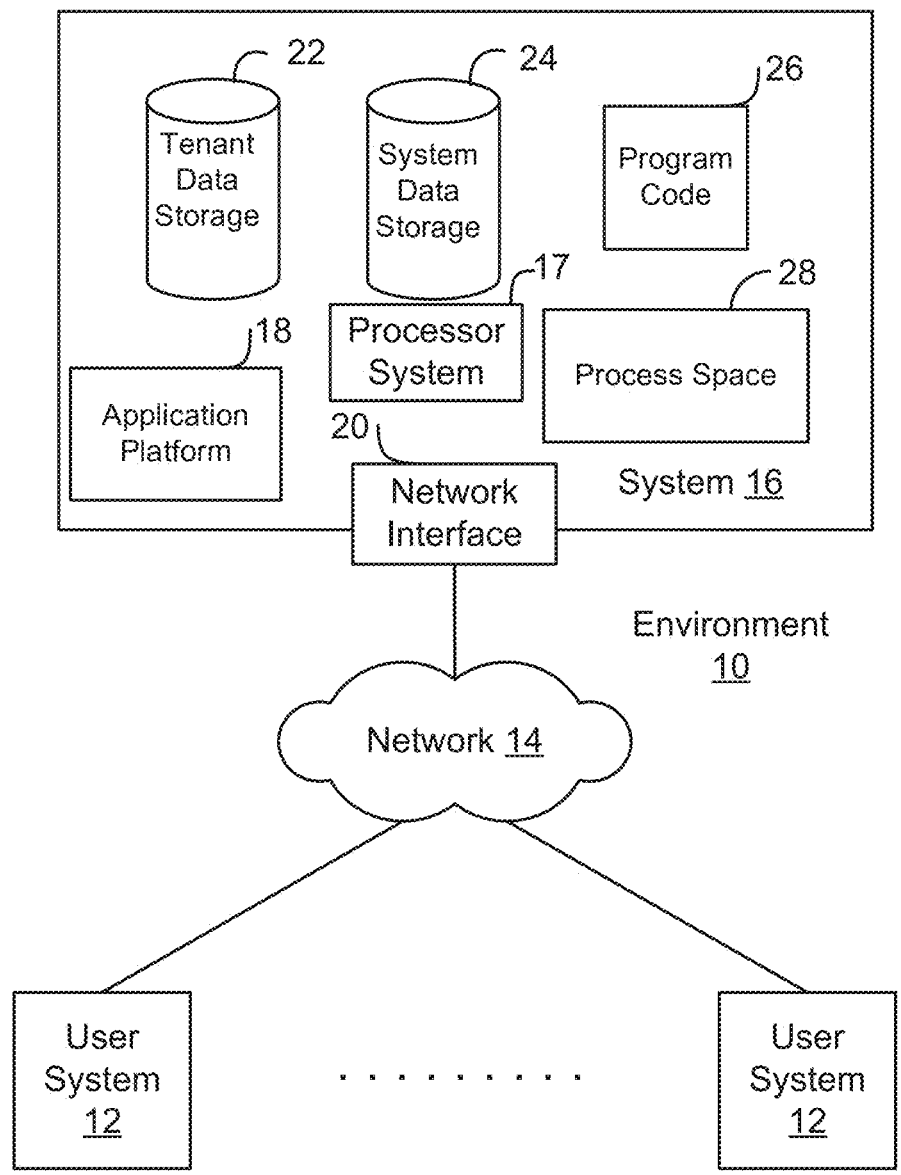
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media, or a combination thereof, arranged for creating, editing and posting new items to an enterprise social networking system. The new items may be posted to a feed system of the enterprise social networking system. In such a system, users may be permitted to see a post, depending on a variety of security settings in the system, also called permissions.

In some embodiments, a method may include establishing at the database system a connection with a remote computing device; receiving a request from the remote computing device to create a new post for delivery to the feed system; and, responsive to the request, initializing a new post. Further, the database system may send to the remote computing device, information to cause remote computing device to generate a first screen display comprising a first field and a second field. The second field may be a content field, displaying text or other input received from the author of the new post at the remote computing device user interface. The first field may comprise a TO field to display information about who is going to receive the post. The TO field display may be auto-generated, responsive to recipients identified in the content field.

In some embodiments, the TO field may display a summary of recipients who will have access to the new post. The first and second display fields may be part of an authoring tool user interface. In some embodiments, the authoring tool may be implemented as a software application. In some embodiments, the authoring tool implements additional functionality to assist an author in selecting and managing recipients, topics, and attachments for the post. In some embodiments, the author may be able to override the normal feed system permissions to control which users will have access to the new post.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by Salesforce.com, Inc. of San Francisco, Calif. Salesforce.com, Inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by Salesforce.com, Inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), micro drives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VB Script, and many other programming languages as are well known may be used. (Java™ is a trademark of Sun Microsystems, Inc.).

Figure 1B:
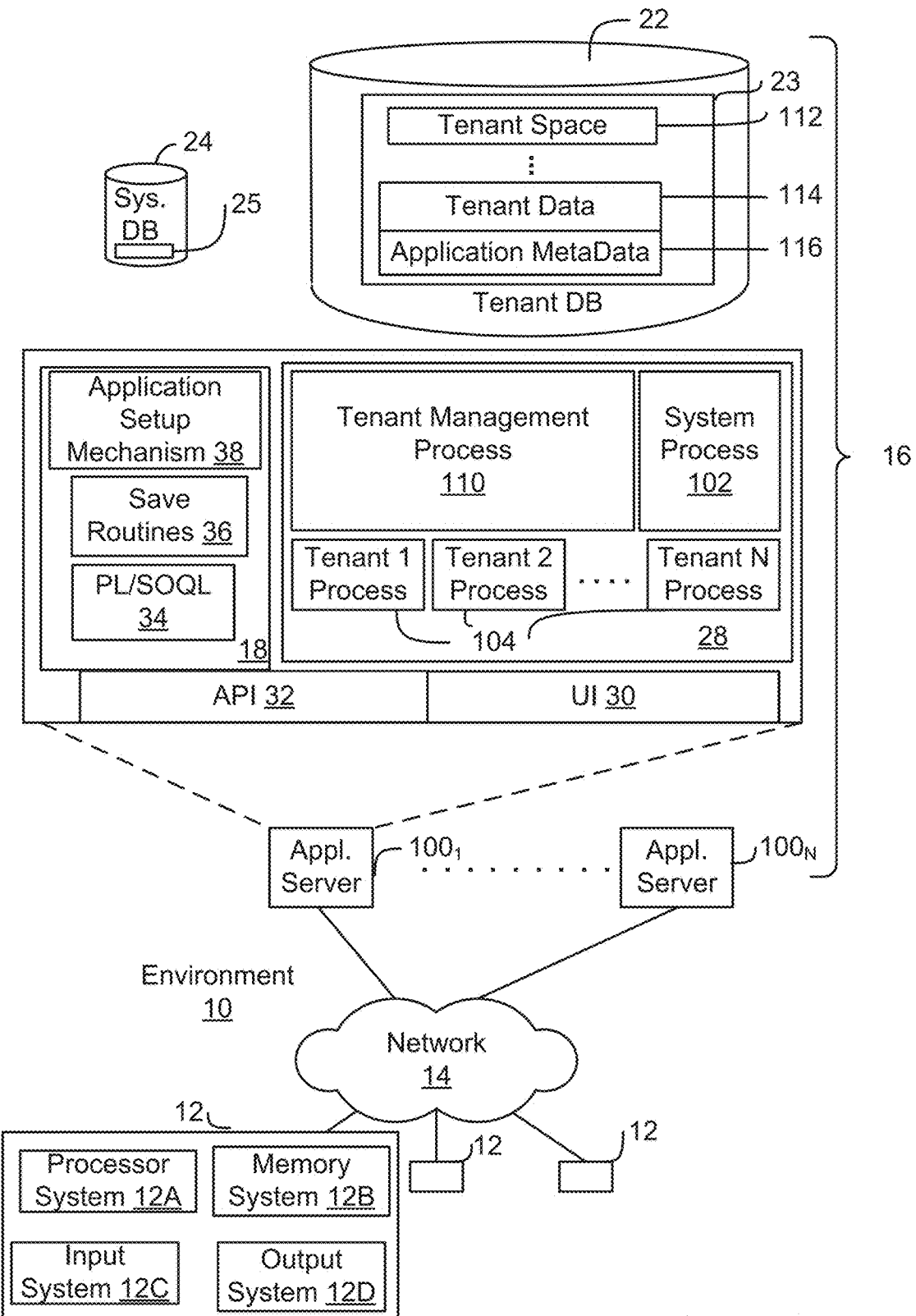
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems at virtually any location. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
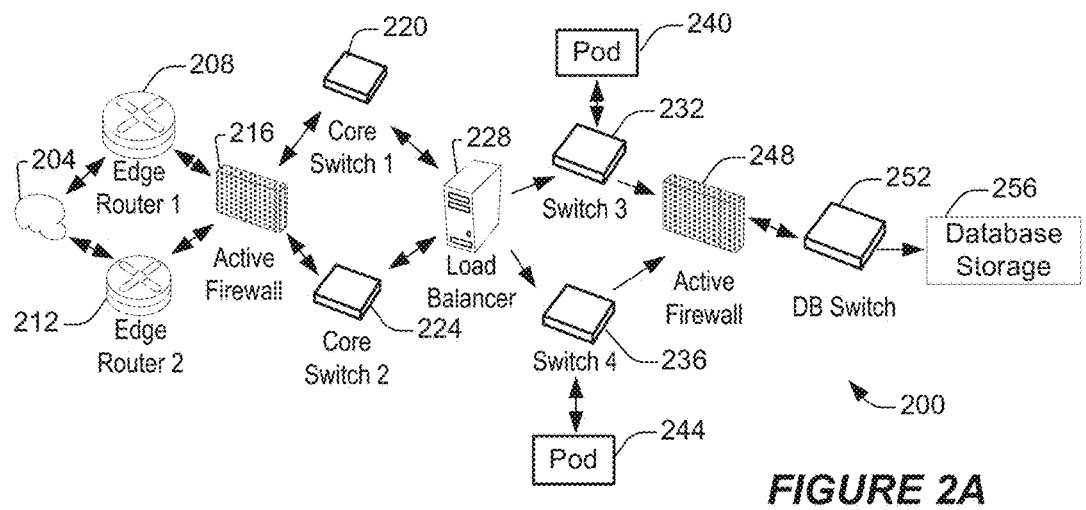
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
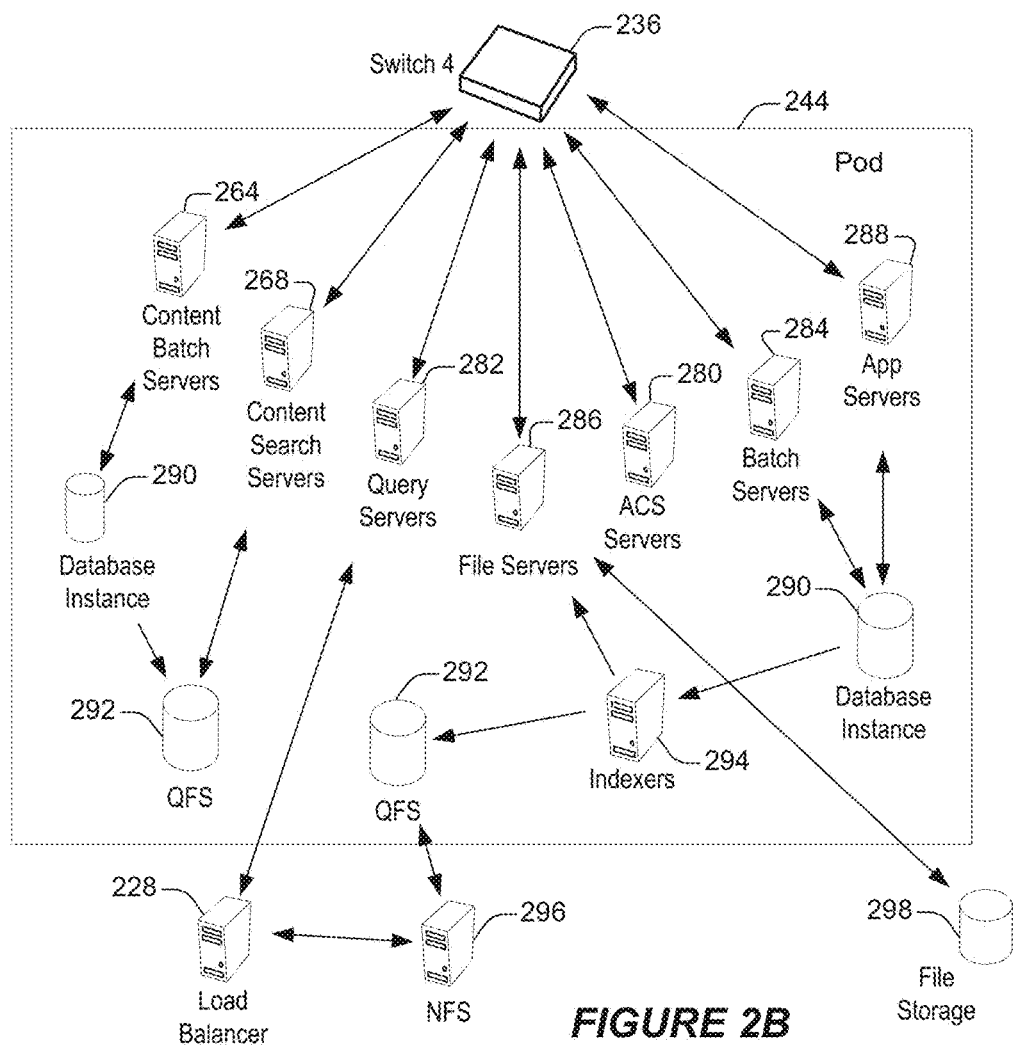
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file servers 286 can manage requests for information stored in the file storage 298. The file storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, a QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

II. Enterprise Social Networking

As initially described above, in some implementations, some of the methods, processes, devices and systems described herein can implement, or be used in the context of, enterprise social networking. Some online enterprise social networks can be implemented in various settings, including businesses, organizations and other enterprises (all of which are used interchangeably herein). For instance, an online enterprise social network can be implemented to connect users within a business corporation, partnership or organization, or a group of users within such an enterprise. For instance, a Chatter® can be used by users who are employees in a business organization to share data, communicate, and collaborate with each other for various enterprise-related purposes. Some of the disclosed methods, processes, devices, systems and computer-readable storage media described herein can be configured or designed for use in a multi-tenant database environment, such as described above with respect to system 16. In an example implementation, each organization or a group within the organization can be a respective tenant of the system.

In some implementations, each user of the database system 16 is associated with a "user profile." A user profile refers generally to a collection of data about a given user. The data can include general information, such as a name, a title, a phone number, a photo, a biographical summary, or a status (for example, text describing what the user is currently doing, thinking or expressing). As described below, the data can include messages created by other users. In implementations in which there are multiple tenants, a user is typically associated with a particular tenant (or "organization"). For example, a user could be a salesperson of an organization that is a tenant of the database system 16.

A "group" generally refers to a collection of users within an organization. In some implementations, a group can be defined as users with the same or a similar attribute, or by membership or subscription. Groups can have various visibilities to users within an enterprise social network. For example, some groups can be private while others can be public. In some implementations, to become a member within a private group, and to have the capability to publish and view feed items on the group's group feed, a user must request to be subscribed to the group (and be accepted by, for example, an administrator or owner of the group), be invited to subscribe to the group (and accept), or be directly subscribed to the group (for example, by an administrator or owner of the group). In some implementations, any user within the enterprise social network can subscribe to or follow a public group (and thus become a "member" of the public group) within the enterprise social network.

A "record" generally refers to a data entity, such as an instance of a data object created by a user or group of users of the database system 16. Such records can include, for example, data objects representing and maintaining data for accounts, cases, opportunities, leads, files, documents, orders, pricebooks, products, solutions, reports and forecasts, among other possibilities. For example, a record can be for a business partner or potential business partner (for example, a client, vendor, distributor, etc.) of a user or a user's organization, and can include information describing an entire enterprise, subsidiaries of an enterprise, or contacts at the enterprise. As another example, a record can be a project that a user or group of users is/are working on, such as an opportunity (for example, a possible sale) with an existing partner, or a project that the user is trying to obtain. A record has data fields that are defined by the structure of the object (for example, fields of certain data types and purposes). A record also can have custom fields defined by a user or organization. A field can include (or include a link to) another record, thereby providing a parent-child relationship between the records.

Records also can have various visibilities to users within an enterprise social network. For example, some records can be private while others can be public. In some implementations, to access a private record, and to have the capability to publish and view feed items on the record's record feed, a user must request to be subscribed to the record (and be accepted by, for example, an administrator or owner of the record), be invited to subscribe to the record (and accept), be directly subscribed to the record or be shared the record (for example, by an administrator or owner of the record). In some implementations, any user within the enterprise social network can subscribe to or follow a public record within the enterprise social network.

In some online enterprise social networks, users also can follow one another by establishing "links" or "connections" with each other, sometimes referred to as "friending" one another. By establishing such a link, one user can see information generated by, generated about, or otherwise associated with another user. For instance, a first user can see information posted by a second user to the second user's profile page. In one example, when the first user is following the second user, the first user's news feed can receive a post from the second user submitted to the second user's profile feed.

In some implementations, users can access one or more enterprise network feeds (also referred to herein simply as "feeds"), which include publications presented as feed items or entries in the feed. A network feed can be displayed in a graphical user interface (GUI) on a display device such as the display of a user's computing device as described above. The publications can include various enterprise social network information or data from various sources and can be stored in the database system 16, for example, in tenant database 22. In some implementations, feed items of information for or about a user can be presented in a respective user feed, feed items of information for or about a group can be presented in a respective group feed, and feed items of information for or about a record can be presented in a respective record feed. A second user following a first user, a first group, or a first record can automatically receive the feed items associated with the first user, the first group or the first record for display in the second user's news feed. In some implementations, a user feed also can display feed items from the group feeds of the groups the respective user subscribes to, as well as feed items from the record feeds of the records the respective user subscribes to.

The term "feed item" (or feed element) refers to an item of information, which can be viewable in a feed. Feed items can include publications such as messages (for example, user-generated textual posts or comments), files (for example, documents, audio data, image data, video data or other data), and "feed-tracked" updates associated with a user, a group or a record (feed-tracked updates are described in greater detail below). A feed item, and a feed in general, can include combinations of messages, files and feed-tracked updates. Documents and other files can be included in, linked with, or attached to a post or a comment. For example, a post can include textual statements in combination with a document. The feed items can be organized in chronological order or another suitable or desirable order (which can be customizable by a user) when the associated feed is displayed in a graphical user interface (GUI), for instance, on the user's computing device.

Messages such as posts can include alpha-numeric or other character-based user inputs such as words, phrases, statements, questions, emotional expressions, or symbols. In some implementations, a comment can be made on any feed item. In some implementations, comments are organized as a list explicitly tied to a particular feed item such as a feed-tracked update, post, or status update. In some implementations, comments may not be listed in the first layer (in a hierarchal sense) of feed items, but listed as a second layer branching from a particular first layer feed item. In some implementations, a "like" or "dislike" also can be submitted in response to a particular post, comment or other publication.

A "feed-tracked update," also referred to herein as a "feed update," is another type of publication that may be presented as a feed item and generally refers to data representing an event. A feed-tracked update can include text generated by the database system in response to the event, to be provided as one or more feed items for possible inclusion in one or more feeds. In one implementation, the data can initially be stored by the database system in, for example, tenant database 22, and subsequently used by the database system to create text for describing the event. Both the data and the text can be a feed-tracked update, as used herein. In some implementations, an event can be an update of a record and can be triggered by a specific action by a user. Which actions trigger an event can be configurable. Which events have feed-tracked updates created and which feed updates are sent to which users also can be configurable. Messages and feed updates can be stored as a field or child object of a record. For example, the feed can be stored as a child object of the record.

As described above, a network feed can be specific to an individual user of an online social network. For instance, a user news feed (or "user feed") generally refers to an aggregation of feed items generated for a particular user, and in some implementations, is viewable only to the respective user on a home page of the user. In some implementations a user profile feed (also referred to as a "user feed") is another type of user feed that refers to an aggregation of feed items generated by or for a particular user, and in some implementations, is viewable only by the respective user and other users following the user on a profile page of the user. As a more specific example, the feed items in a user profile feed can include posts and comments that other users make about or send to the particular user, and status updates made by the particular user. As another example, the feed items in a user profile feed can include posts made by the particular user and feed-tracked updates initiated based on actions of the particular user.

As is also described above, a network feed can be specific to a group of enterprise users of an online enterprise social network. For instance, a group news feed (or "group feed") generally refers to an aggregation of feed items generated for or about a particular group of users of the database system 16 and can be viewable by users following or subscribed to the group on a profile page of the group. For example, such feed items can include posts made by members of the group or feed-tracked updates about changes to the respective group (or changes to documents or other files shared with the group). Members of the group can view and post to a group feed in accordance with a permissions configuration for the feed and the group. Publications in a group context can include documents, posts, or comments.

In some implementations, the group feed also includes publications and other feed items that are about the group as a whole, the group's purpose, the group's description, a status of the group, and group records and other objects stored in association with the group. Threads of publications including updates and messages, such as posts, comments, likes, etc., can define conversations and change over time. The following of a group allows a user to collaborate with other users in the group, for example, on a record or on documents or other files (which may be associated with a record).

As is also described above, a network feed can be specific to a record in an online enterprise social network. For instance, a record news feed (or "record feed") generally refers to an aggregation of feed items about a particular record in the database system 16 and can be viewable by users subscribed to the record on a profile page of the record. For example, such feed items can include posts made by users about the record or feed-tracked updates about changes to the respective record (or changes to documents or other files associated with the record). Subscribers to the record can view and post to a record feed in accordance with a permissions configuration for the feed and the record. Publications in a record context also can include documents, posts, or comments. In some implementations, the record feed also includes publications and other feed items that are about the record as a whole, the record's purpose, the record's description, and other records or other objects stored in association with the record. Threads of publications including updates and messages, such as posts, comments, likes, etc., can define conversations and change over time. The following of a record allows a user to track the progress of that record and collaborate with other users subscribing to the record, for example, on the record or on documents or other files associated with the record.

In some implementations, data is stored in database system 16, including tenant database 22, in the form of "entity objects" (also referred to herein simply as "entities"). In some implementations, entities are categorized into "Records objects" and "Collaboration objects." In some such implementations, the Records object includes all records in the enterprise social network. Each record can be considered a sub-object of the overarching Records object. In some implementations, Collaboration objects include, for example, a "Users object," a "Groups object," a "Group-User relationship object," a "Record-User relationship object" and a "Feed Items object."

In some implementations, the Users object is a data structure that can be represented or conceptualized as a "Users Table" that associates users to information about or pertaining to the respective users including, for example, metadata about the users. In some implementations, the Users Table includes all of the users within an organization. In some other implementations, there may be a Users Table for each division, department, team or other sub-organization within an organization. In implementations in which the organization is a tenant of a multi-tenant enterprise social network platform, the Users Table can include all of the users within all of the organizations that are tenants of the multi-tenant enterprise social network platform. In some implementations, each user can be identified by a user identifier ("UserID") that is unique at least within the user's respective organization. In some such implementations, each organization also has a unique organization identifier ("OrgID").

In some implementations, the Groups object is a data structure that can be represented or conceptualized as a "Groups Table" that associates groups to information about or pertaining to the respective groups including, for example, metadata about the groups. In some implementations, the Groups Table includes all of the groups within the organization. In some other implementations, there can be a Groups Table for each division, department, team or other sub-organization within an organization. In implementations in which the organization is a tenant of a multi-tenant enterprise social network platform, the Groups Table can include all of the groups within all of the organizations that are tenants of the multitenant enterprise social network platform. In some implementations, each group can be identified by a group identifier ("GroupID") that is unique at least within the respective organization.

In some implementations, the database system 16 includes a "Group-User relationship object." The Group-User relationship object is a data structure that can be represented or conceptualized as a "Group-User Table" that associates groups to users subscribed to the respective groups. In some implementations, the Group-User Table includes all of the groups within the organization. In some other implementations, there can be a Group-User Table for each division, department, team or other sub-organization within an organization. In implementations in which the organization is a tenant of a multi-tenant enterprise social network platform, the Group-User Table can include all of the groups within all of the organizations that are tenants of the multitenant enterprise social network platform.

In some implementations, the Records object is a data structure that can be represented or conceptualized as a "Records Table" that associates records to information about or pertaining to the respective records including, for example, metadata about the records. In some implementations, the Records Table includes all of the records within the organization. In some other implementations, there can be a Records Table for each division, department, team or other sub-organization within an organization. In implementations in which the organization is a tenant of a multi-tenant enterprise social network platform, the Records Table can include all of the records within all of the organizations that are tenants of the multitenant enterprise social network platform. In some implementations, each record can be identified by a record identifier ("RecordID") that is unique at least within the respective organization.

In some implementations, the database system 16 includes a "Record-User relationship object." The Record-User relationship object is a data structure that can be represented or conceptualized as a "Record-User Table" that associates records to users subscribed to the respective records. In some implementations, the Record-User Table includes all of the records within the organization. In some other implementations, there can be a Record-User Table for each division, department, team or other sub-organization within an organization. In implementations in which the organization is a tenant of a multi-tenant enterprise social network platform, the Record-User Table can include all of the records within all of the organizations that are tenants of the multitenant enterprise social network platform.

In some implementations, the database system 16 includes a "Feed Items object." The Feed items object is a data structure that can be represented or conceptualized as a "Feed Items Table" that associates users, records and groups to posts, comments, documents or other publications to be displayed as feed items in the respective user feeds, record feeds and group feeds, respectively. In some implementations, the Feed Items Table includes all of the feed items within the organization. In some other implementations, there can be a Feed Items Table for each division, department, team or other sub-organization within an organization. In implementations in which the organization is a tenant of a multi-tenant enterprise social network platform, the Feed Items Table can include all of the feed items within all of the organizations that are tenants of the multitenant enterprise social network platform.

Enterprise social network news feeds are different from typical consumer-facing social network news feeds (for example, FACEBOOK®) in many ways, including in the way they prioritize information. In consumer-facing social networks, the focus is generally on helping the social network users find information that they are personally interested in. But in enterprise social networks, it can, in some instances, applications, or implementations, be desirable from an enterprise's perspective to only distribute relevant enterprise-related information to users and to limit the distribution of irrelevant information. In some implementations, relevant enterprise-related information refers to information that would be predicted or expected to benefit the enterprise by virtue of the recipients knowing the information, such as an update to a database record maintained by or on behalf of the enterprise. Thus, the meaning of relevance differs significantly in the context of a consumer-facing social network as compared with an employee-facing or organization member-facing enterprise social network.

In some implementations, when data such as posts or comments from one or more enterprise users are submitted to a network feed for a particular user, group, record or other object within an online enterprise social network, an email notification or other type of network communication may be transmitted to all users following the respective user, group, record or object in addition to the inclusion of the data as a feed item in one or more user, group, record or other feeds. In some online enterprise social networks, the occurrence of such a notification is limited to the first instance of a published input, which may form part of a larger conversation. For instance, a notification may be transmitted for an initial post, but not for comments on the post. In some other implementations, a separate notification is transmitted for each such publication, such as a comment on a post.

Figure 3:
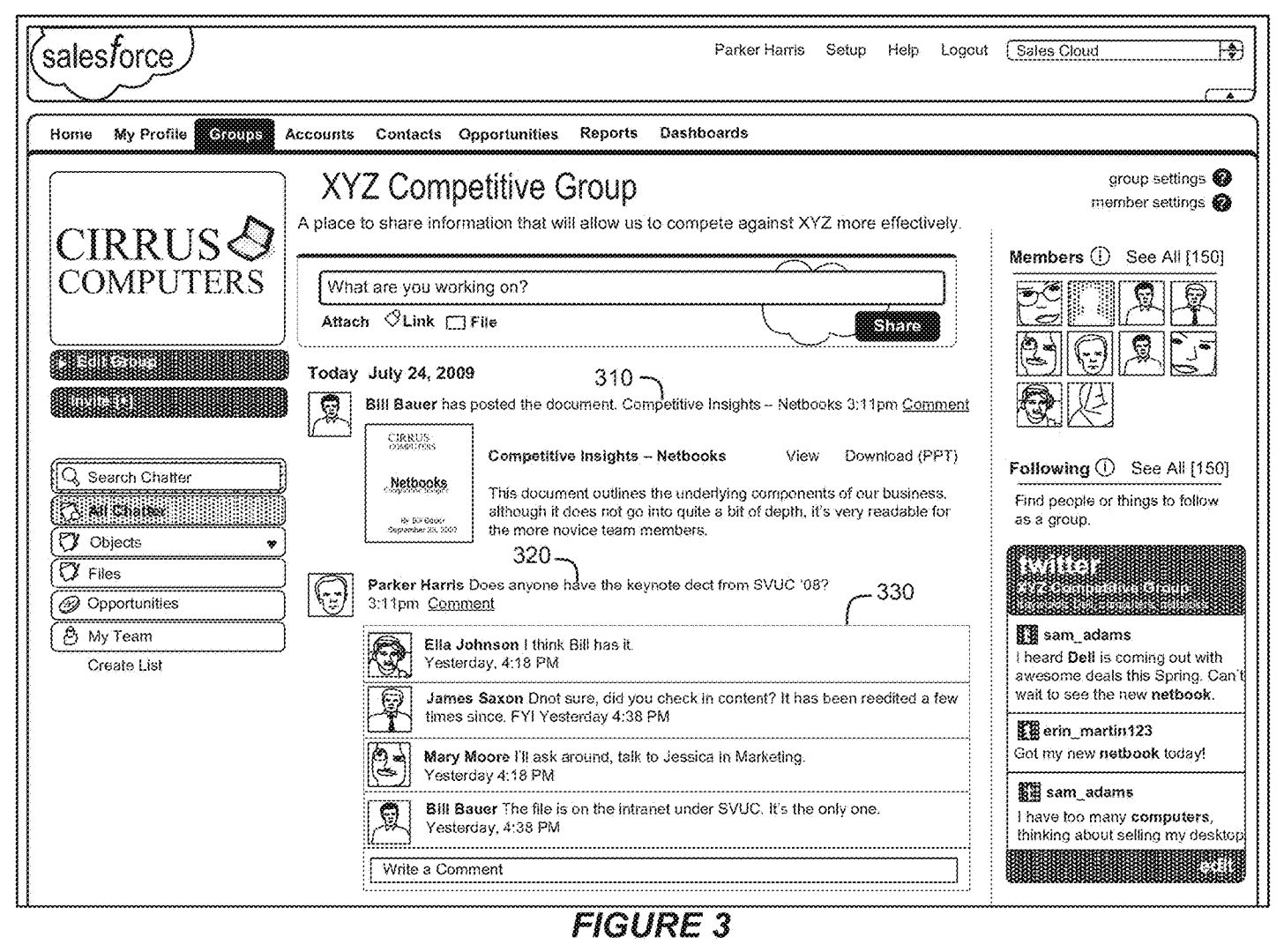

FIG. 3 shows an example of a group feed on a group profile page according to some implementations. As shown, a feed item 310 shows that a user has posted a document to the group feed. The text "Bill Bauer has posted the document Competitive Insights" can be generated by the database system in a similar manner as feed-tracked updates about a record being changed. A feed item 320 shows a post to the group, along with comments 330 from Ella Johnson, James Saxon, Mary Moore and Bill Bauer.

Figure 4A:
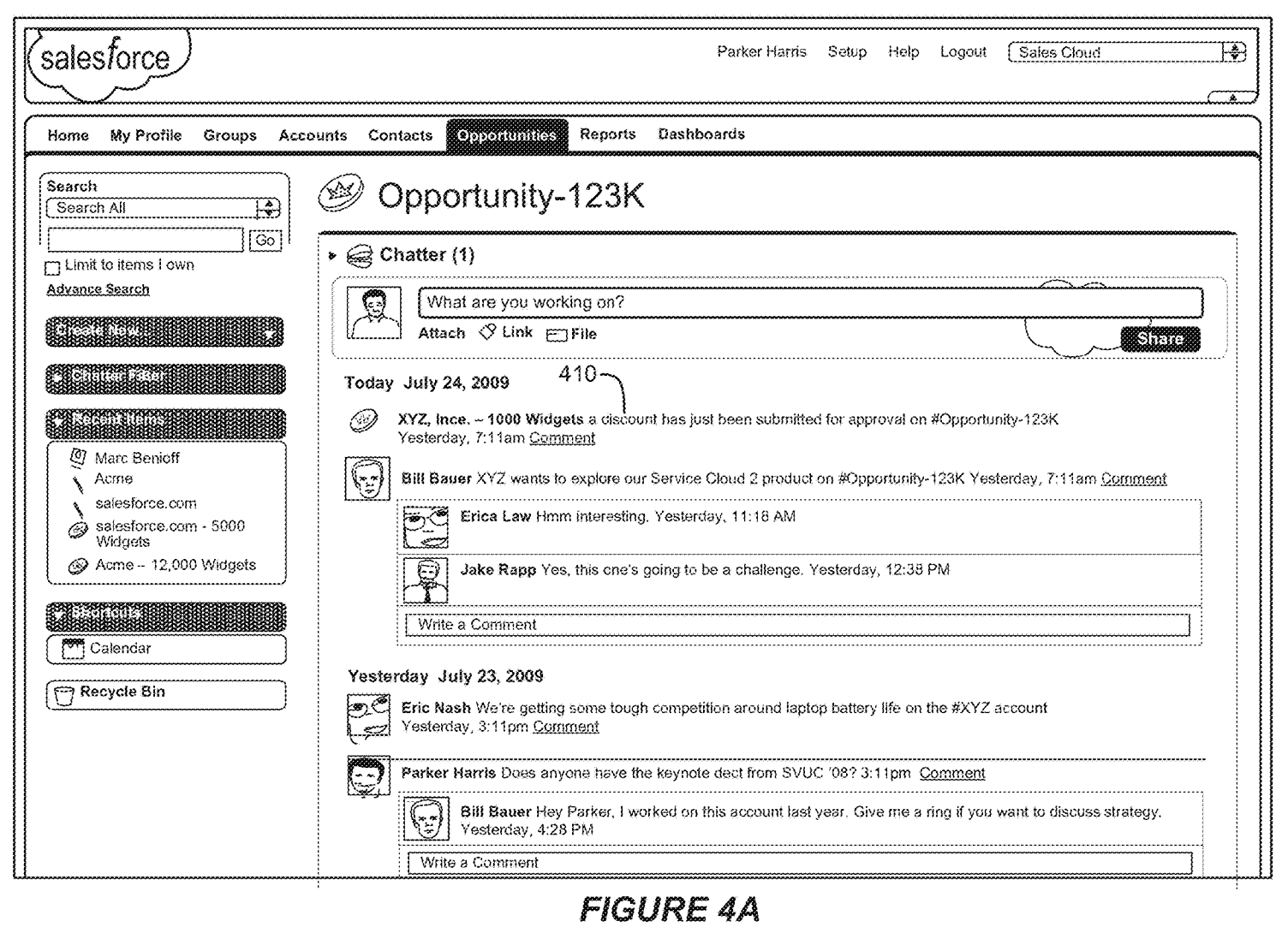

FIG. 4A shows an example of a record feed on a record profile page according to some implementations. The record feed includes a feed-tracked update, a post, and comments. Feed item 410 shows a feed-tracked update based on the event of submitting a discount for approval. A feed-tracked update may be generated by the system automatically, as noted. Other feed items show posts, for example, from Bill Bauer, made to the record and comments, for example, from Erica Law and Jake Rapp, made on the posts.

III. Authoring New Electronic Posts

Figure 4B:
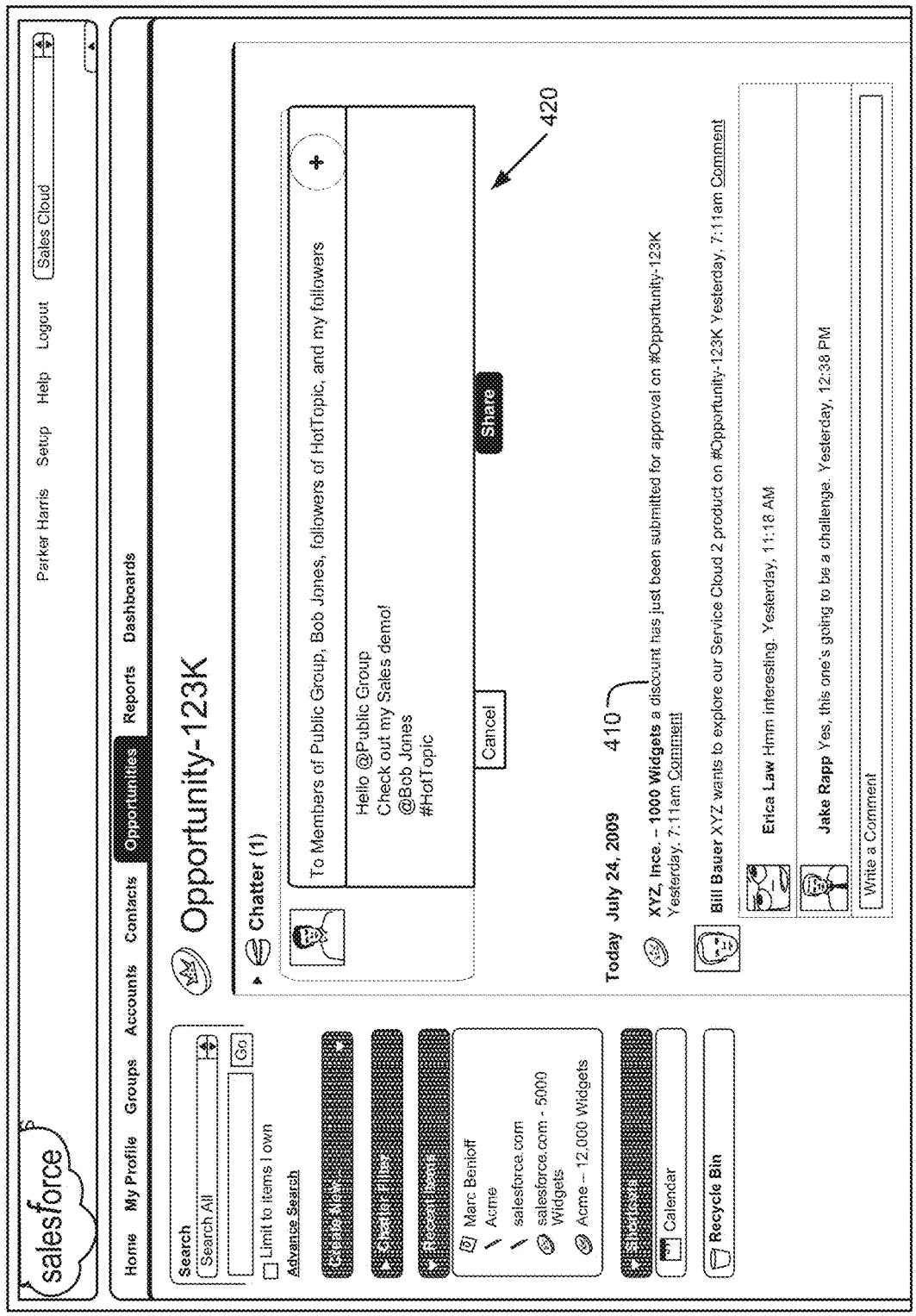
FIG. 4B shows an example of the record feed page of FIG. 4A with an authoring tool activated to support creating a new post according to some implementations.

FIG. 4B shows an example of a record feed as in FIG. 4A with an authoring panel or window 420. Panel 420 comprises a user interface of an authoring tool described in more detail below. The authoring tool may be launched, in some embodiments, by clicking a soft "button" (not shown) dedicated for that purpose on one or more profile pages. In another embodiment, the authoring tool may be invoked by clicking anywhere in a new post field such as 430, see "What are you working on?" When the authoring tool is launched, it may open a panel such as panel 420 or a new window. Fields and content in panel 420 are described in more detail below, in the context of a mobile application. The features and operations described in the mobile application may be implemented as well in desktop or other environments.

Figure 5A:
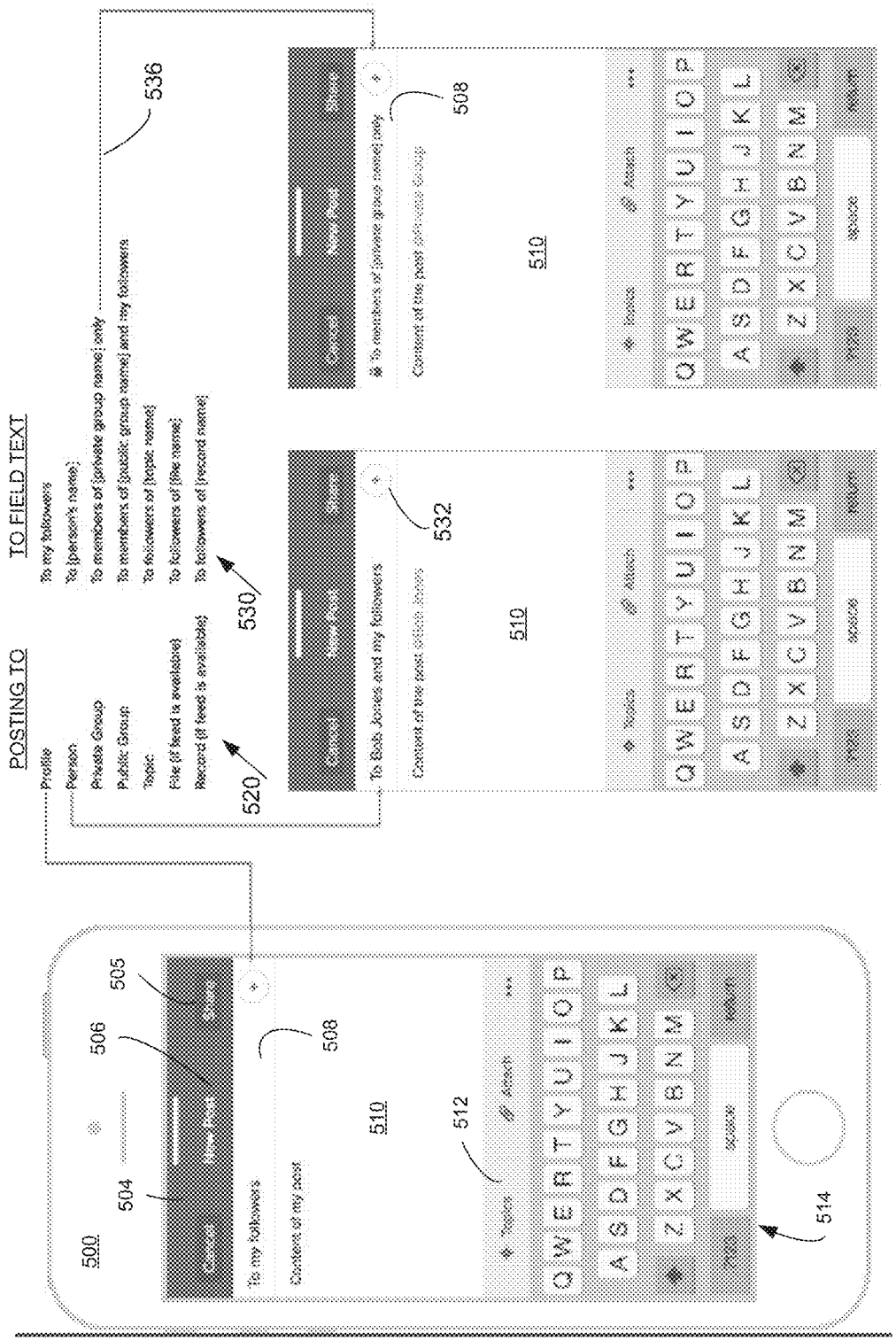
FIG. 5A is a hybrid diagram illustrating an example of a user interface screen display and certain operations of an authoring tool to create a new post according to some implementations.

FIG. 5A illustrates selected screen displays and operations of an authoring tool for publishing a new post in a network such as an enterprise collaboration system according to some embodiments. These and some subsequent illustrations suggests a smart phone 500, but the authoring tool may be deployed in any suitable device including without limitation a mobile phone, tablet computer, laptop computer, wearable device such as a watch, etc. Further, the user interface may be implemented in a vehicle. In an embodiment, it may be executed as an application on a vehicle display screen or "head unit." Almost any device with a display screen, user input means, and network connectivity can be used. The user input means may comprise a keyboard 514, along with hard keys, soft keys or a combination thereof. It may implement voice input (and optionally audible output). Voice input may be combined with key input or touch-screen taps, swipes or other gestures to accomplish the functionality described herein.

A smartphone embodiment with a touchscreen input is used for illustration. Referring again to FIG. 5A, a device 500 such as a smartphone includes a display screen, in this case a touchscreen. The screen display may include, in one state, a keyboard 514, which may be retractable, as shown later. The screen display may include a first panel 504, which preferably shows a current state of the display, here indicated by the label "New Post" at 506. The first panel also may include one or more soft buttons, such as a Share button 505, used to indicate that a post is completed and ready to publish. The first panel need not be limited to the top of the screen as shown.

The screen display further includes a second panel 508 which we call the TO field, used to summarize recipients of a post under construction as explained later. In some embodiments, the TO field itself also may be a touch-sensitive button useful to change the display or invoke a corresponding function. We use TO in upper case hereafter to indicate the TO field name or function, rather than the preposition "to." In the first illustration, at the left side of FIG. 5A, the TO field 508 says, "To my followers" which is an example of programmable text used to indicate that the author's followers are included among recipients of the post under construction (PUC). (Author refers to the user of the tool who is creating a post.) In an embodiment, the author's followers may be included among recipients by default. The message "To my followers" serves as a reminder to the author. A list 520 under the heading POSTING TO illustrates examples of recipients that may be selected by the author of the post. These may include, for example, a profile, person, private group, public group, etc. Selected Files and Records may be included if a feed is available. Another list 530 under the heading TO FIELD TEXT shows examples of text that can be displayed by the authoring tool in the TO field 508 to identify and summarize explicitly what recipients have been selected by the author. In this way, who will have access to the post is made transparent. The lists 520, 530 are aligned so that for a given POSTING TO item, the corresponding TO FIELD TEXT appears to the right. The authoring tool generates the TO field display content; it is responsive to user input, as explained below, but not directly editable by the user in a preferred embodiment.

For example, in the middle of FIG. 5A, the screen display is updated to show the addition of Bob Jones in the TO field. This is in response to a user entering "@Bob Jones" in the Content Field 510 (by typing, touching, speaking or any other input means). Thus when an author types @Bob Jones in the content field, a corresponding indication (preferably sans @-sign) automatically appears in the TO field 508 as shown. Another way to add a recipient in some embodiments is to tap the + button 532 in the TO field, which may open a search screen or other functionality to assist a user in selecting a recipient.

In another example, at the right side of FIG. 5A, the screen display shows the addition of a private group in the TO field. The group or any other recipient can be added into the content field by the author, for example, using the soft keyboard 514. Recipients may be identified, for example, using @-sign notation, or any other symbol, indicator, prefix, suffix, etc. Each recipient is then automatically reflected in the TO field; where it may take a modified form, as illustrated by the TO FIELD TEXT examples in column 530. In the TO field, auto-generated text 530 (programmable) preferably is inserted to make the recipients more transparent or apparent to the author before posting. In this example, the recipient will be @Private Group only. The auto-generated text insert step is indicated by line 536 which is for descriptive purposes and not a part of the screen display under discussion. It shows "To members of [private group name] only" now displayed in the TO field 508. Additional examples of "posting to" entries and corresponding TO field auto-generated text are shown in the drawing at 520-530. These examples are merely illustrative and not intended to be limiting.

Figure 5B:
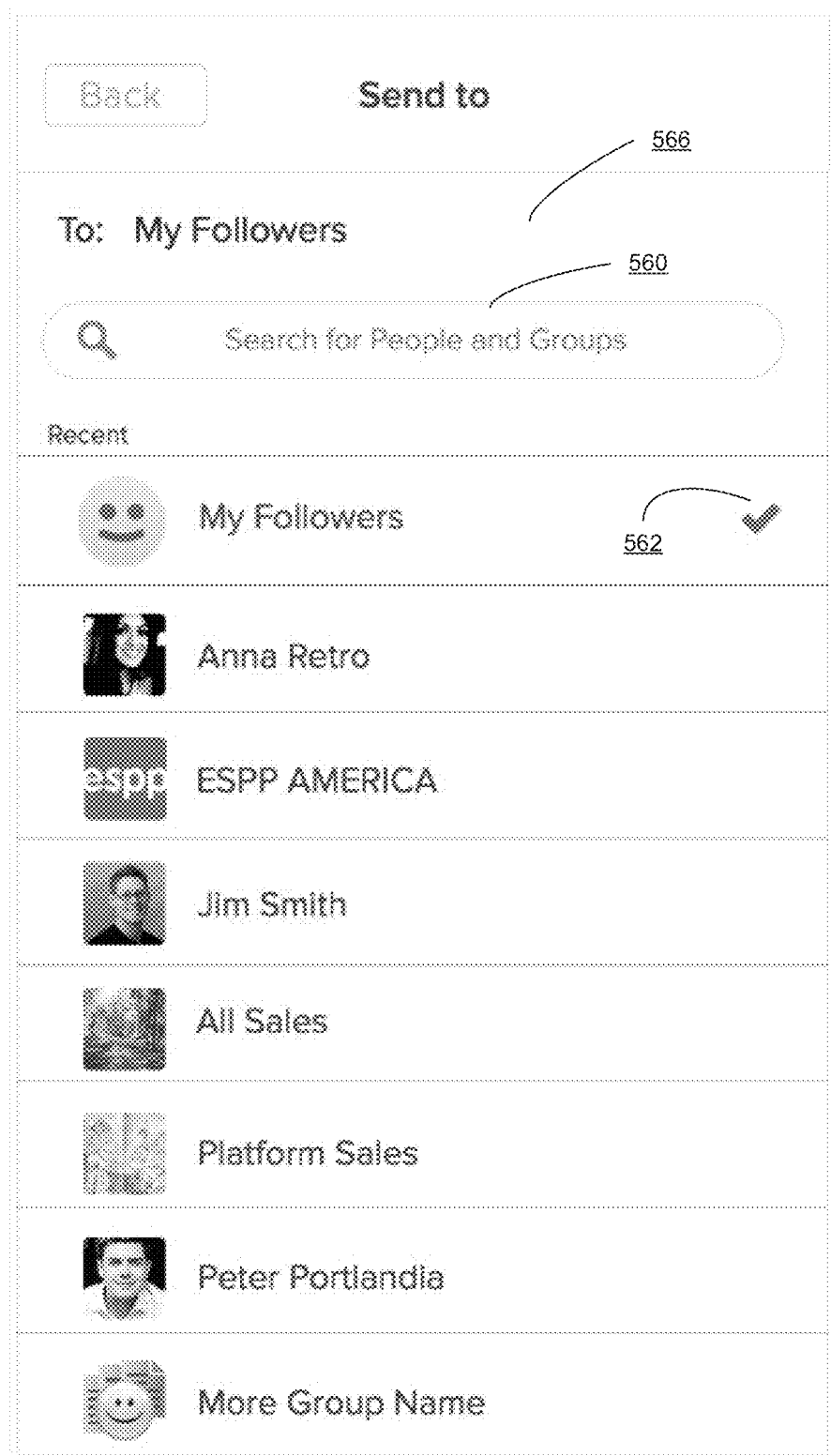
FIG. 5B illustrates an example of a Send To screen display of a user interface arranged to assist an author in selecting recipients of a post under construction.

FIG. 5B is an illustration of a "Send to" screen display, including a search field shown at 560, to support searching for people and groups during the post authoring process. In some embodiments, the tool may provide a list of entities in the system with whom the author has had contact recently. These are illustrated below the word Recent. A "contact" for this purpose should be broadly construed to include not only a direct or explicit contact, such as a text message, but also merely accessing a feed that includes an entity as a subscriber or other indirect contacts. A checkmark 562 may be displayed to indicate an entity in the Recent list that is selected for inclusion in the TO field 566; in this case "My Followers" is selected.

Figures 13A, 13B:
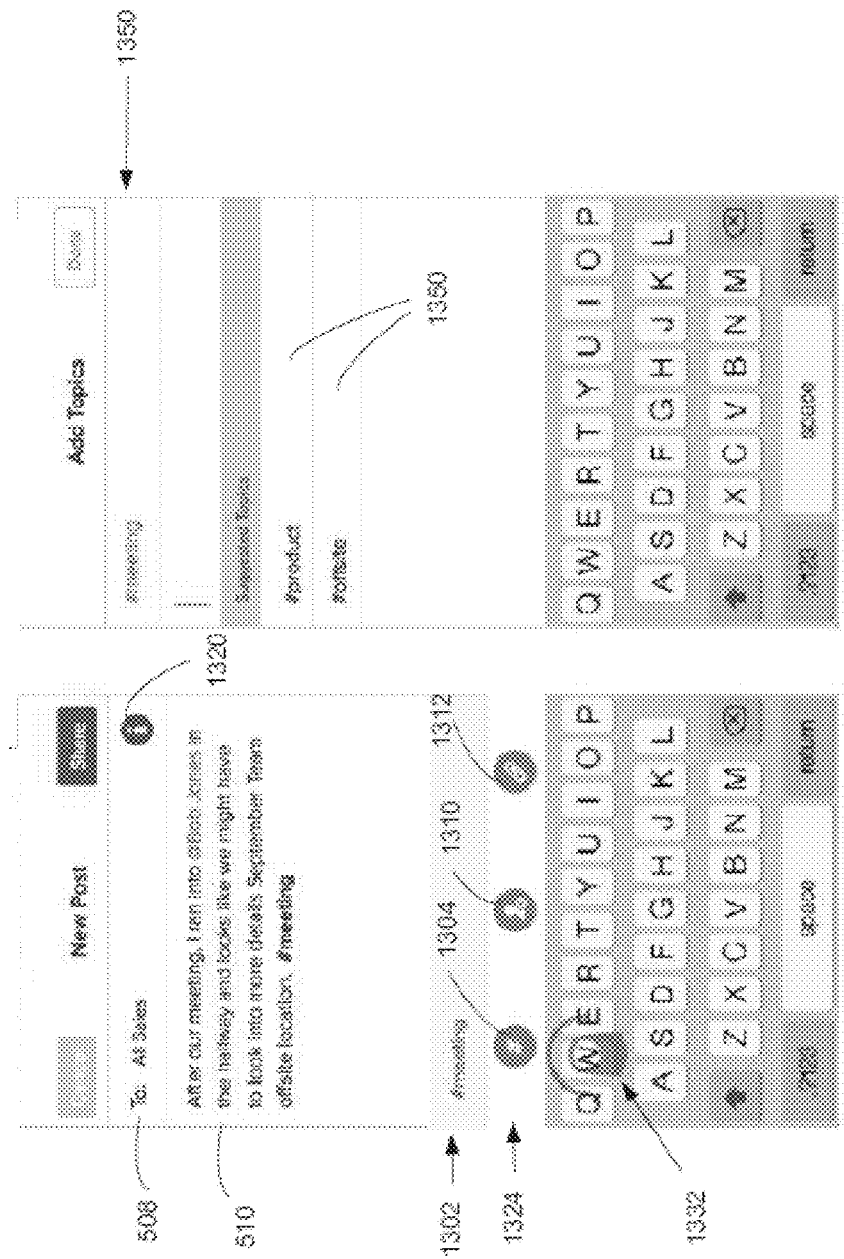
FIGS. 13A-13B are user interface screen displays illustrating some further operations of an authoring tool according to some implementations.

In some embodiments, the Send To screen may be invoked by tapping the + button 532, shown in FIG. 5A. This may be called an ADD button. The recipient ADD button need not necessarily be located in the TO field. (For example, FIG. 13A shows a different embodiment that includes a button 1310 to add a person to the TO field.) Button 1310 may launch a search function to assist the author in making that selection, similar to that illustrated in FIG. 5B.

Figure 6A:
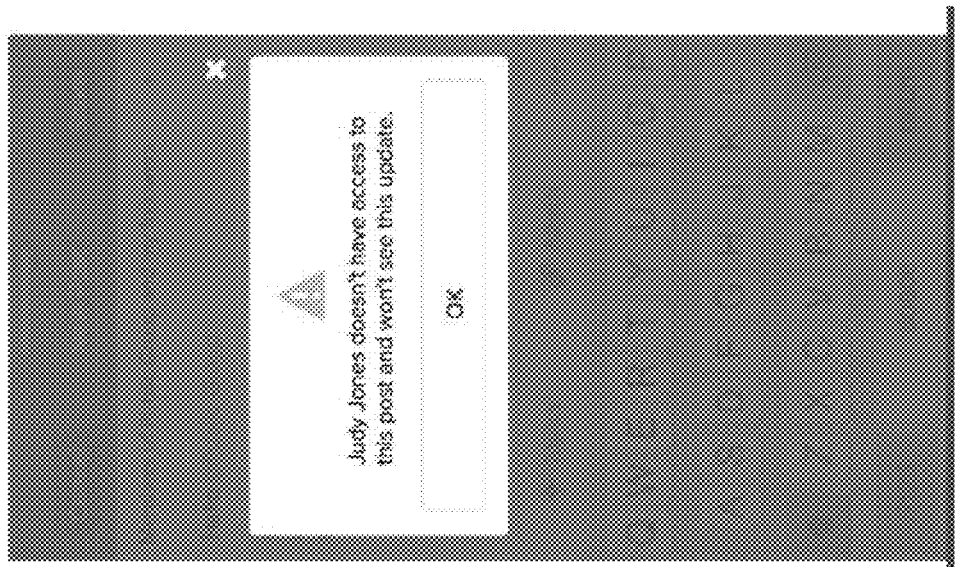
FIGS. 6A-6B further illustrate an example of an author tool user interface and a recipient validation feature of the authoring tool of FIGS. 5A-5B according to some implementations.
Figure 6B:
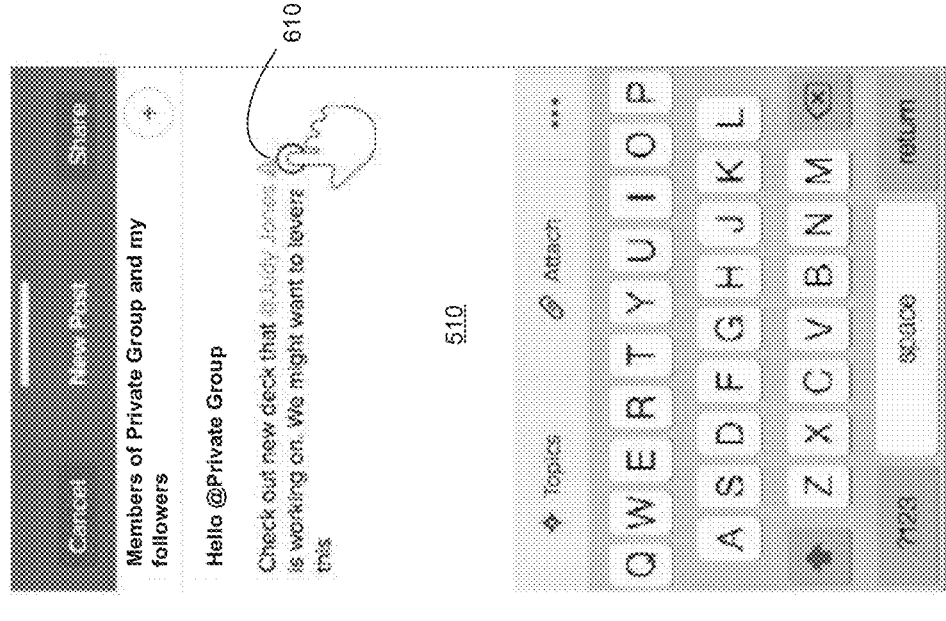

Turning to FIG. 6A, it illustrates a "New Post" screen display in which the author has listed @Judy Jones as a recipient in the content field 510. (The title at the top of the New Post screen is not critical; other indicia may be used, for example, an icon.) In an embodiment, the system automatically verifies whether Judy Jones would be an authorized recipient of the post, i.e., whether she will be permitted to view or otherwise take action on or with the post. This may be done by checking security settings in the database. In this example, an alert symbol 610 is generated and displayed adjacent the name. Other indicia may be used to alert the author. For example, the un-authorized recipient name may change color, or blink, or otherwise attract the author's attention. Responsive to the author tapping the alert symbol 610, or double-clicking the name, or other equivalent input, the system may display an explanation as illustrated by FIG. 6B. In short, the system may validate each potential recipient as they are entered. The author is kept appraised of exactly who will have access to the post when posted.

In another embodiment (not shown), the author may be presented with a panel in which to modify to ability of a selected user to access the post. Thus the author may be able to override the present permission settings in the database to allow a user, say Judy Jones, to see the post.

FIGS. 7A, 7B and 7C further illustrate operation of a post authoring tool according to some embodiments. In FIG. 7A, a user interface is shown as described above. Here, the TO field 508 displays recipients, "Public Group and my (the author's) followers." Recall, the TO field 508 content is generated by the system; it is not editable directly by the author. In FIG. 7B, the author has added a person recipient @Bob Jones in the post content field 510 (along with other text). The system essentially monitors input to the content field, and responsive to an indication of a new recipient, for example, by use of the @ sign, hash tag # or other indicator, the system creates a related entry in the TO field panel 508. The TO field panel makes explicit just what entities or persons will see the post. Here are some examples:

In the case of a single individual user recipient, the TO field may simply display the name (preferably removing any prefix, suffix, @-sign, etc.). In some embodiments, by default, the TO field may add the phrase "and my followers" or the like to the display to remind the author that her followers will see the post. In the case that a group recipient is identified by the author in the content panel, for example, "@ Public Group" as shown in FIG. 7B, the system may display the phrase, "Members of Public Group" or similar language in the TO field display 508, again to make more explicit who will see the post while the author is constructing it.

The author may wish to see which individual users may see the post. In another embodiment (not shown), the user may select an entity in the TO field 508 and request a list of the corresponding users. For example, the "Public Group" may be selected for display of a list of all users who currently belong to that group. This information may be available elsewhere (say a group feed or profile), but here the author can check it without leaving the new post creation process. Further, the author may be able to block one of the listed members from receiving the specific post under construction.

FIG. 7C shows the further addition of a topic "#HotTopic" added in the content field 510. In response, the system may display, "followers of HotTopic" or similar language in the TO field 508, again to make more transparent who will see the new post. In some embodiments (not shown), the author may request more details about the recipients. For example, the author may click (or right-click, or otherwise select) on a group name. The system may then open a panel to display a list of the members of the selected group. Similarly, the system may display a list of followers of a selected topic upon request. At any time, when the author is satisfied with the post, he may activate the "Share" button in the upper right of the figure to submit the post to the feed system.

Referring now to FIG. 8A, it shows the interface display of FIG. 7C and identifies a Topic flag—in this example a small circle 802 or the like. Preferably, the topic flag may include a numeral [1] indicating the number of topics presently included as recipients in the PUC. The flag 802 preferably is displayed adjacent to an Add Topics button 804. Adding (and removing) topics is described further below. The interface may also include an Attachment button 806 for attaching an object to the post. The Add Topics button 804 and the Attach button 806 may be arranged within a field 808 that may also include other functions, which may be accessed at 809 by ellipses.

FIG. 8B shows the display after an attachment has been processed. Here, the TO field now includes the attachment file name SalesDemo.ppt. The author may have attached it using the attach button 806. The attachment function may open a browser panel (not shown) to facilitate selection of a file to attach to the post. FIG. 8B now shows a flag 810 adjacent to the attach button 806. Like the topics flag, the attach flag 810 also may indicate a current number of attachments, in this case one.

Referring now to FIG. 8C, the author has completed creating the post, and has closed the keyboard on the display. In some embodiments, responsive to closing the keyboard, or another input, the display may update to list the Topics in a separate topic display section 820. Further, the system may list the attachments (if any) in a separate section 830. An "X" button or other indicator adjacent to a listed topic in section 820 may be used to delete the topic as a recipient of the post. Similarly, the "X" 832 in section 830 may be used to remove the attachment shown. In some embodiments, the button field 808 may be displayed below section 830 to enable convenient addition of other topics or attachments without opening the keyboard.

Figures 9A, 9B:
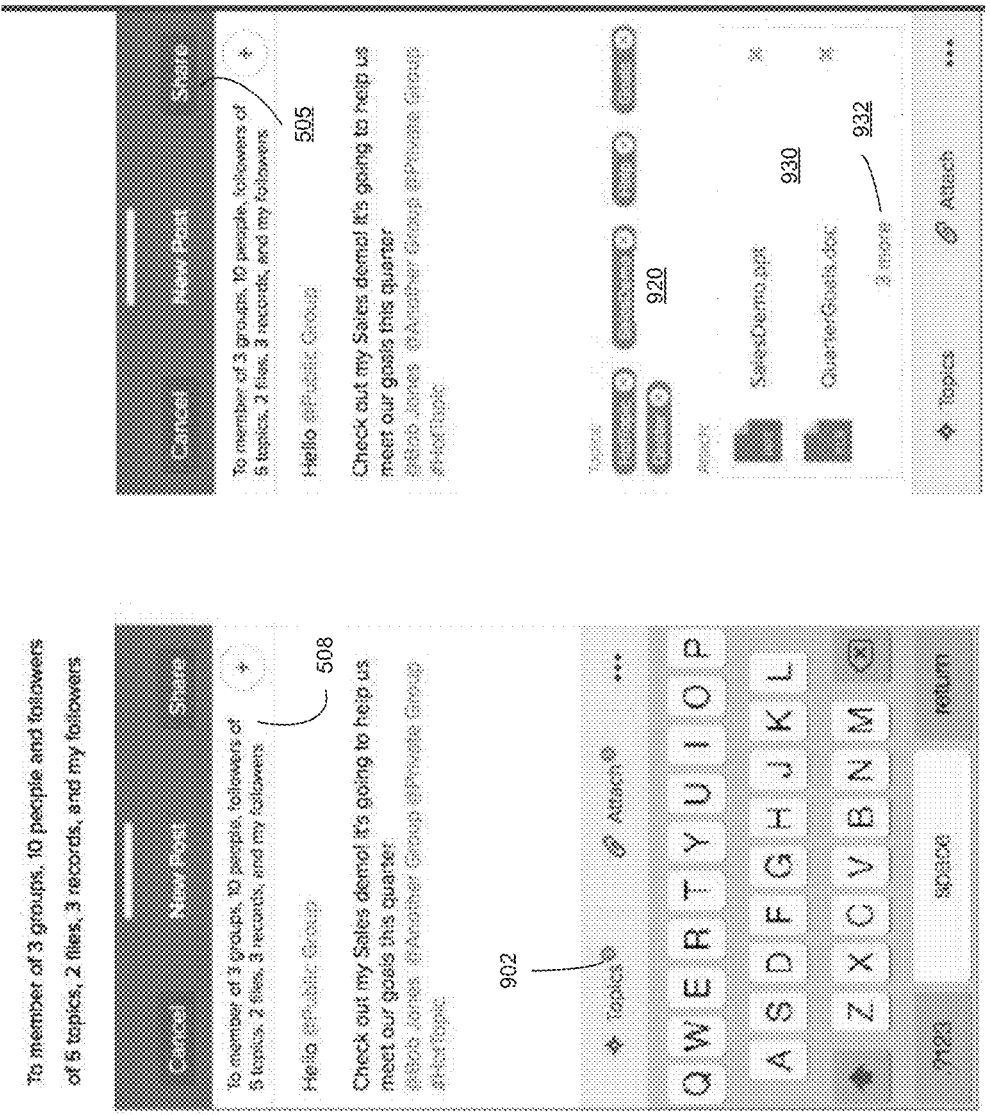
FIGS. 9A-9B further illustrate an example of a user interface and additional features of the authoring tool of FIGS. 5A-5B according to some implementations.

FIG. 9A illustrates additional features of some embodiments. Here, the TO field display summarizes the recipients by type of entity. For example, the illustrated display panel 508 shows the post is directed, "To member of 3 groups, 10 people, followers of 5 topics, 2 files, 3 records, and my followers." In some embodiments, the five selected topics are indicated by the number [5] in the Topics flag 902. Changes to topics and attachments preferably are reflected automatically in the content field and the TO field.

Referring again to FIG. 9A, the TO field summary display also indicates 2 files, 3 records, etc. FIG. 9B illustrates a revised display which may be invoked, for example, by closing the keyboard. Here, the topics are again arranged together in one section 920, with "X" buttons or the like to enable the author to selectively remove any of them. The attachments are also collected, in this example showing the file names and types, in another section 930. An "X" box is provided to selectively remove any of them. Three more attachments are attached, but not shown currently; they may be exposed, for example, by tapping on the "3 more" button 932. Finally, when the author is satisfied with the post, activating the Share button 505 will cause the system to actually post to the feed system as further described below.

Figure 10:
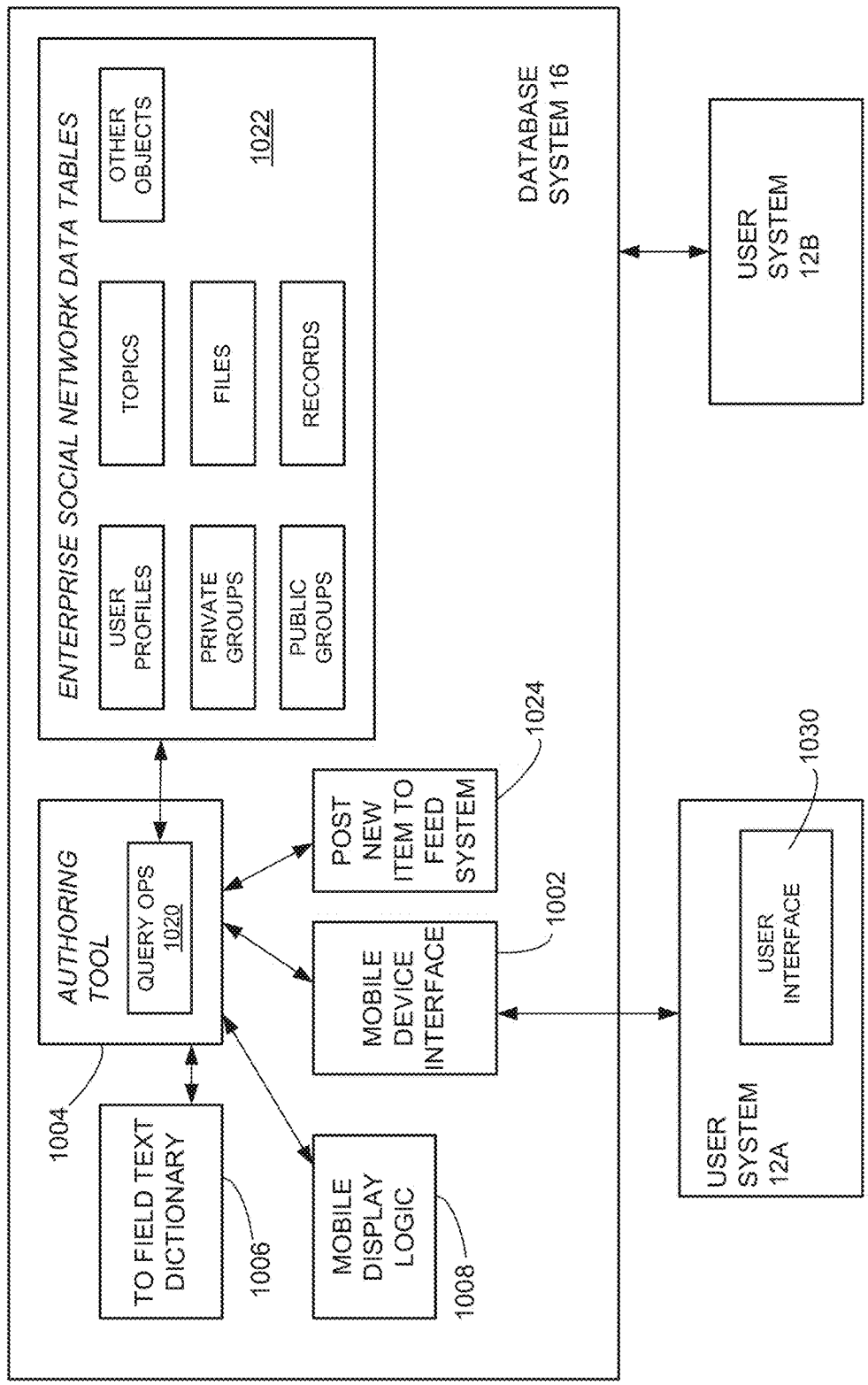
FIG. 10 is a simplified block diagram of a database system including an authoring tool for authoring new electronic posts consistent with some implementations.

FIG. 10 is a simplified block diagram illustrating some aspects of a system in accordance with some embodiments of the present disclosure. The major elements are database system 16 and one or more User Systems 12A, 12B. The user systems were introduced above with regard to FIG. 1A. Such systems may be coupled over a network (not shown) to the database system 16, described above with regard to FIGS. 1A-1B. In FIG. 10, a user system 12A may be a mobile device having a user interface, for example, a smart phone, tablet, laptop, watch or other wearable or portable computing device. Several of the preceding figures illustrate a smart phone screen display which may be part of a user interface 1030 of a user system 12A. The user system alternatively may comprise a so-called PC, desktop computer, server, or other system in a more or less fixed location.

The only limitation for most applications is access to a suitable network to reach the database system. However, off-line operation in which selected portions of data are cached locally also may be used within the scope of this disclosure.

The user system 12A in the present example, interfaces with a mobile device interface module 1002 in the database system 16. The interface 1002 receives inputs from the user interface of the user system, for example, touch screen taps, dragging or other gestures; hard button inputs, etc. The interface 1002 is coupled to an authoring tool software component 1004. Component 1004 may implement some or all of the post authoring features and operations described herein. Component 1004 may include or be coupled to access a TO Field Text Dictionary 1006, described above— see 530, used to create text in the TO field of a PUC. The Component 1004 may also include or be coupled to access a mobile display logic component 1008. The logic 1008 may be used to generate the various user interface screen displays described herein. To implement or update a screen display on the user device 12A, in some embodiments, the display logic 1008 may provide the display data to the component 1004 which, in turn, passes the display data to the user device over the interface 1002.

Preferably, the authoring tool 1004 includes a "Query Ops [operations]" feature 1020, arranged to query one or more databases, labeled Enterprise Social Network Data Tables 1022 in the figure. Representative types of data entities are shown in the figure by way of illustration and not limitation; for example: user profiles, private groups, topics, etc. Other types of data objects may be employed. This illustration is not intended to imply any limitation as to how various data are actually arranged or stored in database system 16. The database query functionality 1020 may be used by component 1004 to support many of the authoring operations already described, such as adding a recipient, adding an attachment, selecting a topic, etc. When a post is completed, a Share input or the like, from the user system 12A, causes the authoring tool component to actually post the new post, block 1024, to the selected recipients.

Figure 11:
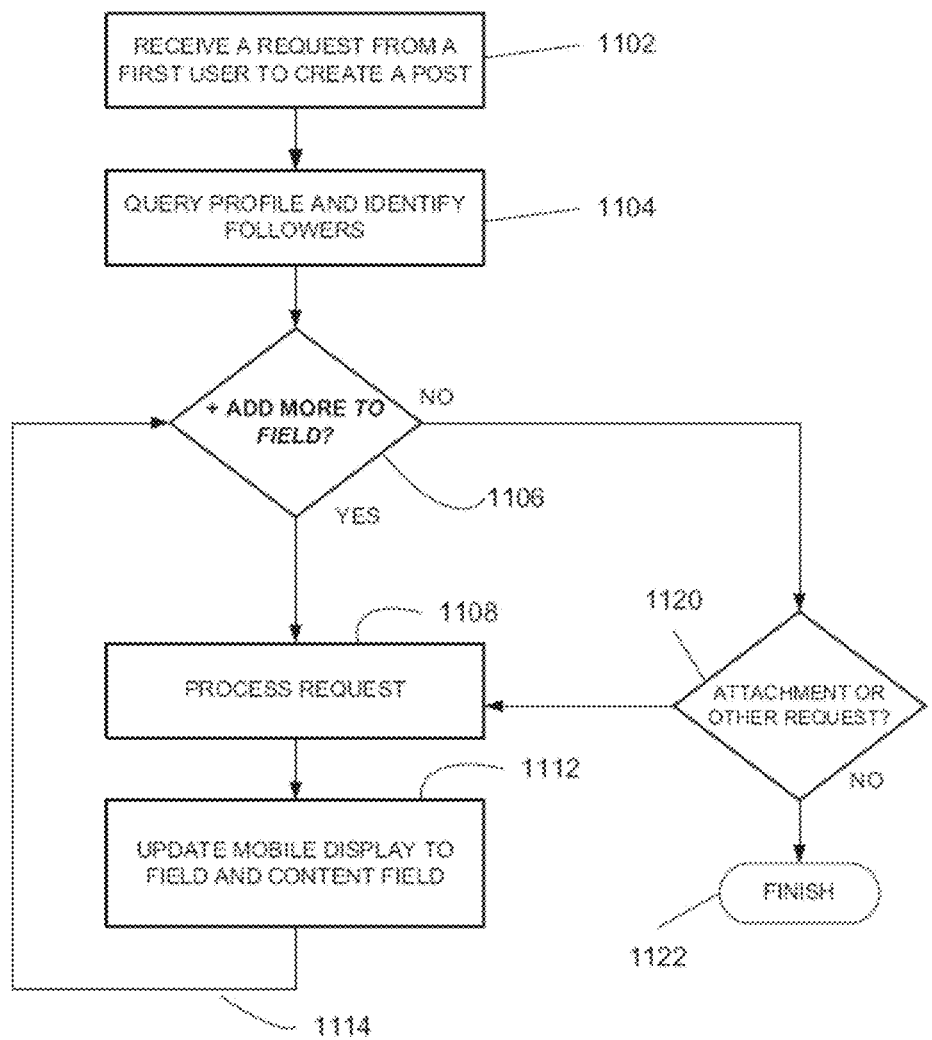
FIG. 11 is a simplified flow diagram illustrating some operations of an authoring tool according to some implementations.

FIG. 11 is simplified flow diagram illustrating some of the operations of an authoring tool according to some implementations. A process of this type may be implemented, for example, in component 1004 in FIG. 10. In block 1102, the process receives a request from a first user (of a database system) to create a new post. The process may query the user's profile to identify the user's followers, block 1104. The author's followers preferably are included as recipient's by default. The process may receive a request to add another recipient to the PUC, for example, a person add request, decision 1106. If so, the add request is processed, block 1108. The processing step 1108 may include validating the proposed recipient. Validation may include determining whether the proposed recipient is authorized to receive or view the PUC once it is posted. (FIG. 6B illustrates an alert that may be displayed when the recipient lacks permission to see the post.)

At block 1112, the user (author's) system display is updated to show a TO field and content field. Examples include TO field 508 and content field 510 in FIGS. 7A-7C. These examples are not intended to be limiting. Other layouts, designs, colors, fonts, arrangements may be used, as long as a TO field and associated Content field are provided, at least on some display screens like the New Post screens in FIGS. 7-8. The content of the TO field is described above with regard to FIGS. 8-9, and will be further described below with regard to FIG. 13A. After the display rendering is updated to reflect the newly added recipient (if valid), the process may loop via 114 to await another input. Referring again to decision 1106, if an input is received that is not a request to add another recipient to the TO field, the process proceeds to decision 1120 to determine if the input is a request to add an attachment to the PUC, or some other request such as adding a topic. These options are described further below. If the request is to Share (i.e., post) the PUC, the process will do that, and then finish, terminator 1122.

Figure 12:
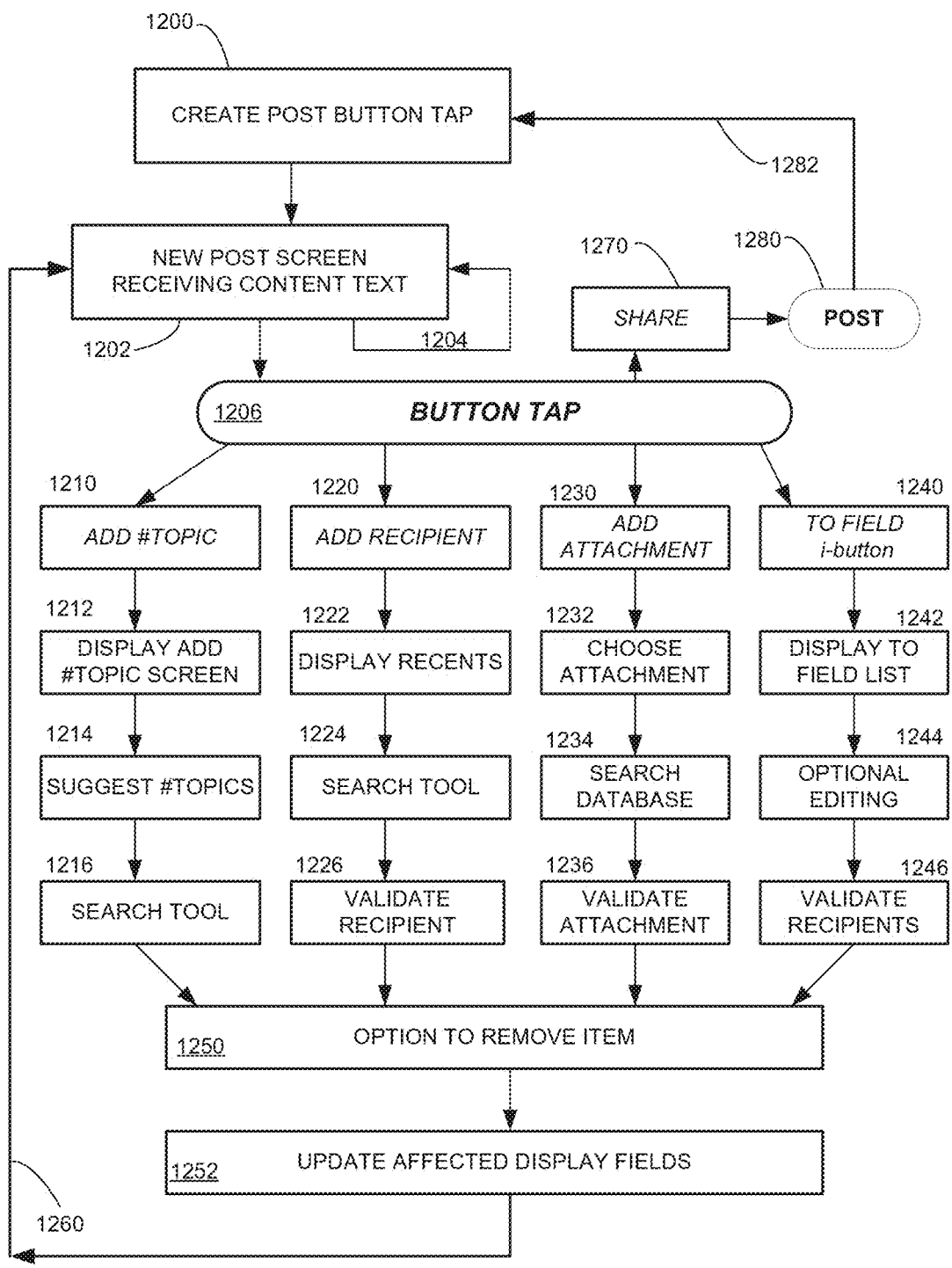
FIG. 12 is a simplified flow diagram of a method for creating a new post consistent with some embodiments of the present disclosure.

FIG. 12 is a simplified flow diagram of a method for creating a new post consistent with some embodiments of the present disclosure. In this diagram, an authoring tool or application is assumed to be communicatively coupled to a database system that implements an enterprise social network. One non-limiting example is the database system 16 described above. In FIG. 12, an author may tap a create post, or new post, button to begin a new post. This launches a new post screen, which may be similar to some of the screen displays described herein. The author may input information, for example, text, block 1202, which will be reflected in a content portion of new post screen display. Additional text may be added as the post is created, loop 1204.

In some embodiments, the author may have one or more controls or buttons available in the user interface, block 1206, to invoke features that support creation or editing of the new post. One button may be used to add a new topic to the post, block 1210. In some embodiments, the system may display an add topic screen, block 1212, responsive to activation of the add topic button. In some embodiments, an add topic screen may be similar to those shown in FIGS. 13 and 14, discussed below. The add topic screen display may include one or more suggested topics, block 1214. The topics may be suggested responsive to text in the content field. The topics may be suggested based on the author's user profile. The topics may be suggested based on recipients of the post or any other criteria. The tool may search the database to find available topics to suggest. The tool preferably provides a search function, block 1216, to help the author in selecting a suitable topic. In some embodiments, the tool may enable the author to create a new topic and add it to the database, "on the fly," meaning without leaving the create new post operation. Once a topic is added to the post, it will be indicated in the updated new post screen, see block 1252. After a topic is added, and the affected display fields are updated, block 1252, the process may return, via loop 1260, to the new post screen, block 1202.

In FIG. 12, another button may be used to add a recipient, block 1220. This action may invoke a screen display of entities or users with whom the author recently had contact, block 1222. The author may select one or more of them to be added to the post as recipients. The tool preferably provides a search function, block 1224, to help the author search a list of users to identify a potential recipient.

At block 1226, the tool validates the selected recipient to determine whether she will have access to the post. This validation may be done by checking applicable permissions in the database system. The validation step may result in an alert, for example, as illustrated in FIG. 6. Once a recipient is added to the post, it will be indicated in the updated new post screen, see block 1252. After the affected display fields are updated, block 1252, the process may return, via loop 1260, to the new post screen, block 1202, as before.

Referring again to FIG. 12, another button may be used to add an attachment to the post, block 1230. This action may cause display of a panel or browser to choose an attachment, block 1232. The attachment may be selected from a local file system. The tool preferably also provides a database search function, block 1234, to enable the author to search the database system files for an attachment, for example, the database system 16. The authoring tool may validate the selected attachment, block 1236. For example, the tool may check whether the author has permission to distribute the attachment. Once an attachment is added to the post, it will be identified in the updated new post screen, see block 1252. After the affected display fields are updated, block 1252, the process may return, via loop 1260, to the new post screen, block 1202, as before.

Referring again to FIG. 12, at block 1240, a TO field information button (i-button) may be implemented. This button causes display of a list of recipients corresponding to those summarized in the To field, block 1242. In an example, activating the i-button may cause display of a list the author's followers. In another example, the i-button may cause display of a list the members of a group recipient of the post. In another example, the i-button may cause display of a list the followers of a topic recipient of the post. One example of an i-button is shown in FIG. 13, described below. The detailed recipient lists may be used for optional editing of recipients, block 1244, by the selective removal of one or more recipients from any of the lists. Removing a user from a recipient list is equivalent to blocking that user's access to the post. After editing, if any, the affected display fields are updated, block 1252, and the process may return, via loop 1260, to the new post screen, block 1202, as before.

At any point that the author is satisfied with the post, she may tap the "Share" button 1270, and the post will be submitted to the feed system, block 1280. After posting, the process may loop back via loop 1282 to give the author the option to begin creation of another post, block 1200. Preferably, the method of FIG. 12 may include an option, block 1250, to enable the author to easily remove from the post any selected topic, recipient (user, group, follower), attachment, etc. Some examples of interface features for effecting removal of items are described below. In general, these features may be used to enable managing recipient entities without the author having to locate the entity and edit its reference in the content field.

FIG. 13A illustrates an example of a New Post screen display in accordance with some embodiments, including a TO field 508 and a content field 510. In this example, the recipient "All Sales" is a group, but it is not identified in the content field 510. This illustrates the case in which the author is logged into or viewing the All Sales group feed page. By default, any new post that she creates in that context will be posted to that feed. The group is included explicitly in the auto-generated TO field display 508 in the interest of completeness, and it serves as a reminder to the author.

This display further includes a panel 1324 that includes one or more soft buttons. One button 1304 (labeled with a hash tag #) enables adding a topic as further explained below. Another button 1310 may be used to add a recipient. A third button 1312 may be used to attach an object such as a file to the post. It may be signified by a paper clip icon, which again is not critical. In general, various buttons may be provided in the new post display for managing recipients and attachments for the post. In some embodiments, these buttons will bring up a new interactive panel or screen to realize the corresponding function. One example is the Add Topic panel described below.

Another panel 1302 may be provided in which all topics currently associated to the post may be listed. This listing reflects the topics (#meeting) entered in the Content Field 510. Topics may be scattered among other text in the Content field. The authoring tool collects them into panel 1302 for convenience and transparency of recipients. In some cases, an author may have inserted an intended topic into the Content Field, but in fact it is not a valid topic. Preferably, the system validates each topic before it appears in the summary panel 1302. This may be part of processing the add request, block 1108 in FIG. 11. An info icon 1320 may be provided to expand the TO field 508 to list the recipients (group members, followers, etc.)

Again referring to FIG. 13A, in some embodiments, a user taps the keyboard (touch screen) as indicated by the finger shadow at 1332. The user is tapping the (#) Add Topic button 1304. This action brings up the Add Topics screen display shown in FIG. 13B. In the Add Topics screen display of this example, a first panel 1350 lists the topics currently associated, similar to panel 1302 in FIG. 13A. Below that panel, a list of suggested topics 1350 (#product, #offsite) may be displayed. In some embodiments, the suggested topics may be generated responsive to text in the Content Field 510. The author may click to select one of the suggested topics and add it to the post. Or, the user may use the keyboard to create a new topic.

Turning to FIG. 14A, the author began typing the letters "art" and the system now displays, in the suggested topics list 1450, all topics that include the letter combination entered. The author can select one by tapping it as indicated at 1452, in this case to select the topic #Article. The selected article is added to the summary field 1454 and associated to the post.

Figure 15C:
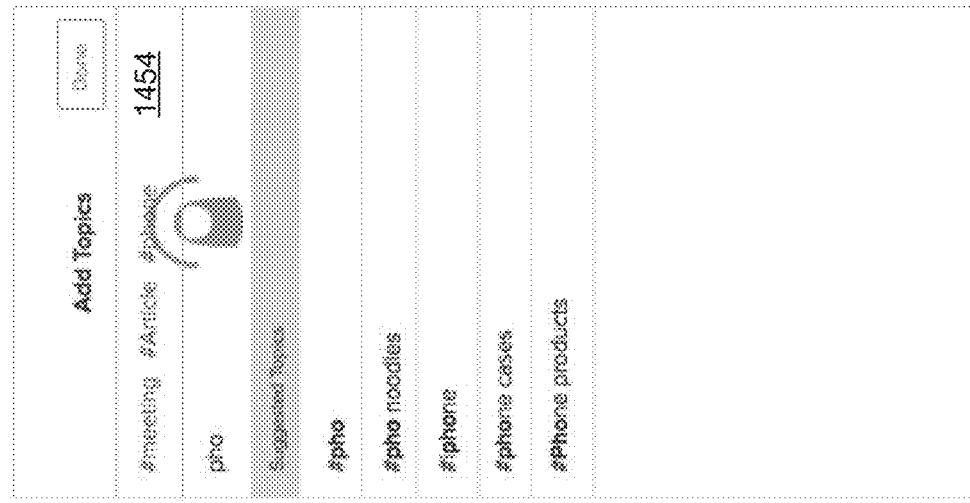
FIGS. 15A-15C are user interface screen displays illustrating additional Add Topics operations of an authoring tool according to some implementations.
Figure 15B:
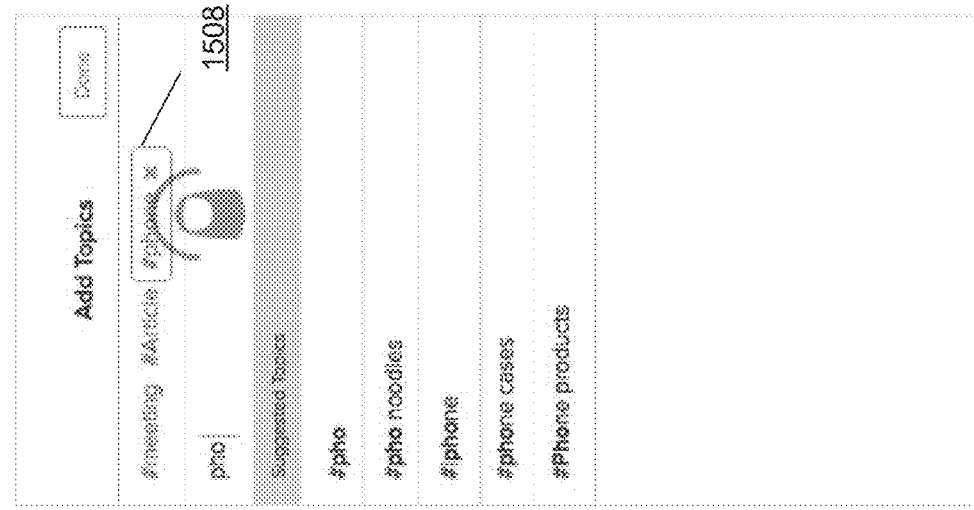
Figure 15A:
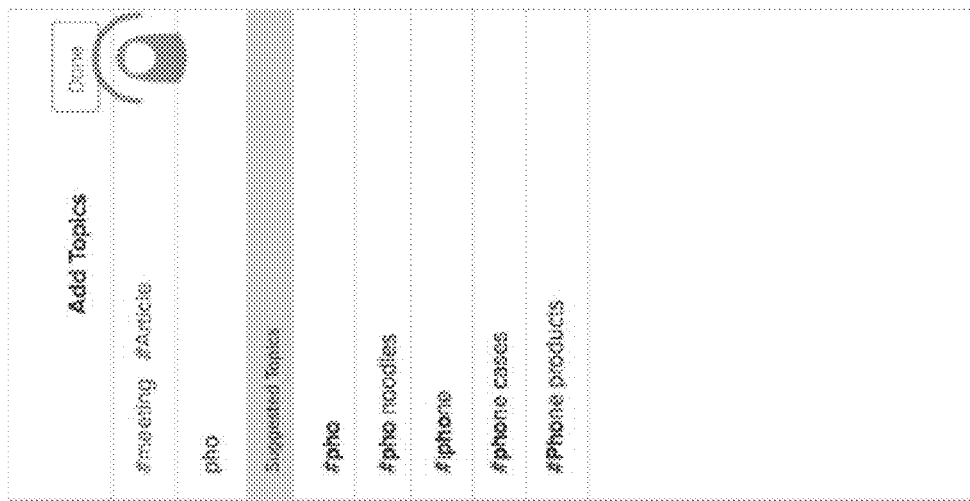

Referring now to FIG. 14B, the author entered the letters "pho" and the system presents a list of suggested topics 1458 that include those letters. The user taps #phone at 1460. FIG. 15A now shows the topic #phone added to the post, as it appears in the summary field 1454 with the others. Now, the user clicks on the topic name #phone in the summary field, and this brings up the display shown in FIG. 15B, in which the selected topic now has an "X" indicator provided at 1508 to enable conveniently removing the topic from the post. FIG. 15C shows the topic has been removed. The user then activates the "Done" button to close the Add Topics panel and return to the New Post panel.

Figure 16A:
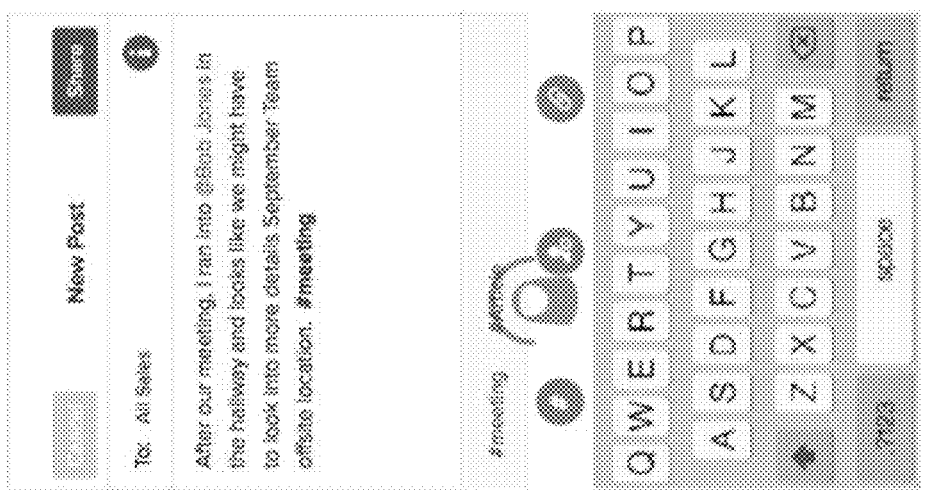
FIGS. 16A-16C are user interface screen displays illustrating additional New Post operations of an authoring tool according to some implementations.
Figure 16B:
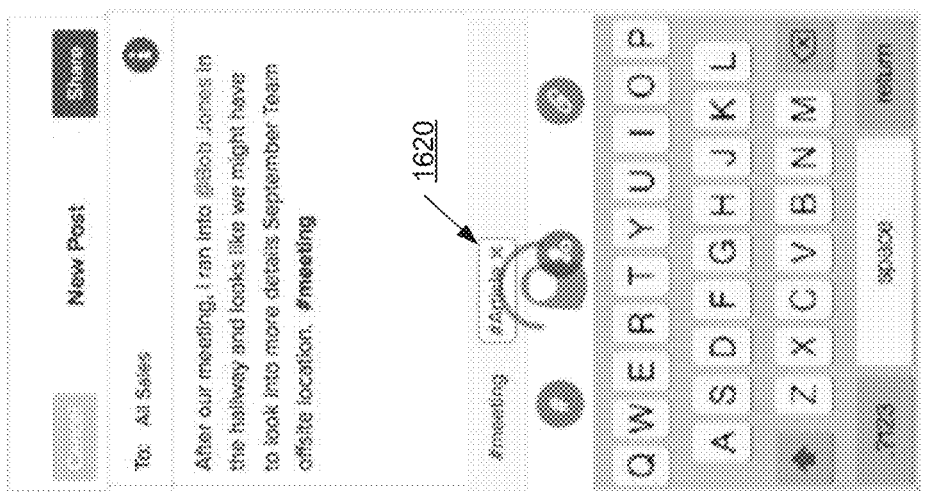
Figure 16C:
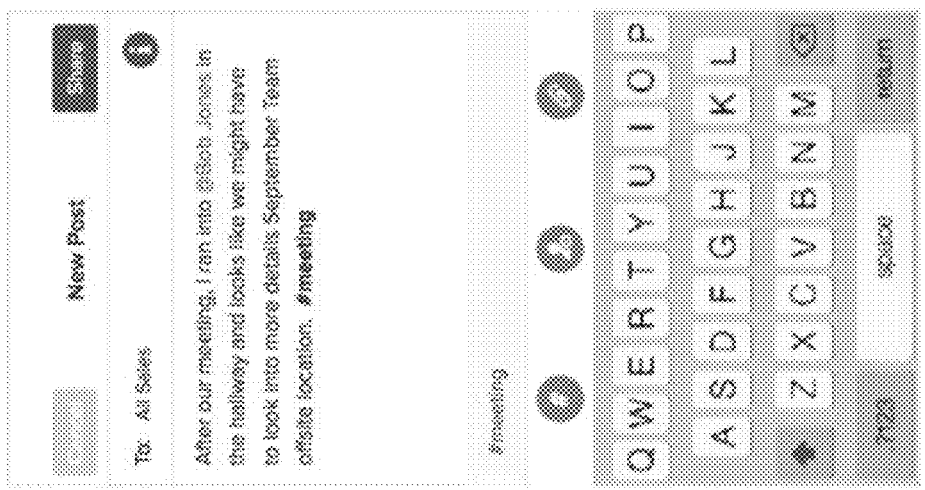

FIG. 16A shows an alternative embodiment in which the author can select a topic (#Article) in a summary panel on the New Post screen without opening a new screen display. As shown in FIG. 16B, selecting a topic may invoke an "X" box 1620 or the like to enable quickly removing the topic from the post. FIG. 16C shows the result.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A method for a database system of creating a post for a feed system for a multi-user social network database driven system, with the social network providing a variety of ways for individual users to be permitted to see a post depending on a variety of security settings in the system, the method comprising the steps of:

establishing at the database system a connection with a remote computing device;

receiving at the database system a request from the remote computing device to create a new post for delivery to the feed system;

at the database system, responsive to the request, initializing a new post;

sending from the database system to the remote computing device, information to cause the remote computing device to generate a first screen display comprising a first field and a second field non-overlapping the first field;

at the database system, updating the second field responsive to user input from an author of the new post received from the remote computing device;

at the database system, before providing access to the new post, generating a summary of recipients selected by the author who will have access to the new post, based at least in part on monitoring information based on the user input to second field;

at the database system, validating each recipient as each recipient is selected by the author for whether the recipient is authorized to view the new post, and sending information to the computing device to display and update the summary of selected recipients, including whether each recipient will have access to the new post in the first field based on the validating; and at the database system, responsive to receiving a share instruction from the remote computing device, permitting viewing of the new post through the feed system for publication to the validated recipients, wherein recipients that were not validated as being authorized to view the new post are not permitted viewing of the new post.

2. The method of claim 1 further comprising:

at the database system, checking the security settings to determine which of the recipients will have access to the new post; and in a case that a recipient will not have access to the post, sending instructions to the remote computing device to cause it to display an alert that the recipient lacks permission to access to the post.

3. The method of claim 2 further comprising, at the database system, receiving an override input from the remote computing device, and responsive to the override input, modifying security settings in the system so as to enable the recipient to have access to the post.

4. The method of claim 1 wherein the social network system implements a variety of ways for individual users to be permitted to see a post, including addressing the post to one or more individual users, addressing the post to one or more groups of users, and permitting at least one of individual users and groups of users to follow at least one entity, the entity selected from a group consisting of an individual poster, a topic, a file and a record; further comprising:

receiving from the remote computing device a selection of an entity that is one of the recipients;

at the database system, responsive to a request from the remote computing device, sending information to the remote computing device to enable it to display a list of followers of the selected entity without exiting the process for creating a post.

5. The method of claim 4 and further comprising, at the database system, receiving a selection of one of the followers on the list for blocking; and blocking the selected follower from access to the new post.

6. The method of claim 1, further comprising:

detecting addition of a topic in the second field of the first screen display as one of the recipients of the post; and updating the summary of recipients in the first field to include display of the topic name, and including in the display an indication that followers of the topic will have access to the post.

7. The method of claim 1, further comprising:

generating a listing of attachments to the new post;

sending from the database system to the remote computing device, information to cause the remote computing device to update the first screen display to include the listing of the attachments in an attachment panel that is outside of the first and second fields.

8. The method of claim 7, further comprising: in the attachment panel, providing a control to enable a user to selectively remove any of the listed attachments from the post.

9. The method of claim 1, further comprising:

sending from the database system to the remote computing device, information to cause the remote computing device to update the first screen display to include indications of a current number of topics and a current number of attachments.

10. The method of claim 1, further comprising:

at the database system, receiving a request from the remote computing device to add a topic as a recipient to the post; and responsive to the request, generating at least one topic suggestion based at least in part on the content of the second field; and sending information to the remote computing device, to cause the remote computing device to display a second screen display that displays at least one suggested topic for addition to the post.

11. The method of claim 1, further comprising:

detecting addition of a group name in the second field of the first screen display as one of the recipients of the post; and updating the summary of recipients in the first field to include display of the group name, and including in the display an indication that members of the group will have access to the post.

12. The method of claim 1, further comprising, at the database system, sending information to the remote computing device to cause it to change the first screen display to a third screen display, wherein the third screen display includes the first field for displaying the summary of recipients, the second field for displaying content of the post, and a third field that lists all topics currently selected for inclusion in the recipients.

13. A computer program stored on a tangible medium for execution in a database system to create a post for a feed system for a multi-user social network database driven system, with the social network providing a variety of ways for individual users to be permitted to see a post depending on a variety of security settings in the system, the computer program comprising a set of instructions operable to:

establish at the database system a connection with a remote computing device;

receive at the database system a request from the remote computing device to create a new post for delivery to the feed system;

at the database system, initialize a new post responsive to the request;

send information from the database system to the remote computing device to cause the remote computing device to generate a first screen display comprising a first field and a second field non-overlapping the first field;

update the second field responsive to user input from an author of the new post received from the remote computing device;

at the database system, before providing access to the new post, generate a summary of recipients selected by the author who will have access to the new post, based at least in part on monitoring content of the second field; and at the database system, validate each recipient as each recipient is selected by the author for whether the recipient is authorized to view the new post, and send information to the computing device to display and update in the first field the summary of selected recipients, including whether each recipient will have access to the new post.

14. The computer program of claim 13 wherein the instructions are further operable to:

detect addition of a topic in the second field of the first screen display as one of the recipients of the post; and update the summary of recipients in the first field to include display of the topic name, and including in the display an indication that followers of the topic will have access to the post.

15. The computer program of claim 13, wherein the set of instructions is further operable to:
   detect addition of a group name in the second field of the first screen display as one of the recipients of the post; and
   update the summary of recipients in the first field to include display of the group name, and including in the display an indication that members of the group will have access to the post.

16. The computer program of claim 13, wherein the set of instructions is further operable to:
   generate a listing of the attachments to the new post;
   send information from the database system to the remote computing device to cause the remote computing device to update the first screen display to display the listing of attachments in an attachment panel that is outside of the first and second fields.

17. The computer program of claim 13, wherein the set of instructions is further operable to:
   check the security settings to determine which of the recipients will have access to the new post; and
   in a case that a recipient will not have access to the post, send instructions to the remote computing device to cause it to display an alert that the recipient lacks permission to access to the post.

18. A database system, comprising:
   a processing system; and
   a memory device coupled to the processing system configured to store feed items for a feed system operated by the database system, with the database system comprising a display of at least some of the feed items for the feed system on a remote computing device, the memory device having instructions stored thereon that, in response to execution by the processing system, are operable to:
   receive at the database system a request from the remote computing device to create a new post for delivery to the feed system;
   at the database system, initialize a new post responsive to the request;
   send information from the database system to the remote computing device to cause the remote computing device to generate a first screen display comprising a first field and a second field non-overlapping the first field;
   update the second field responsive to user input from an author of the new post received from the remote computing device;
   at the database system, before providing access to the new post, generate a summary of recipients selected by the author who will have access to the new post, based at least in part on monitoring content of the second field; and
   at the database system, validate each recipient as each recipient is selected by the author for whether the recipient is authorized to view the new post, and sending information to the computing device to display and update in the first field the summary of selected recipients, including whether each recipient will have access to the new post based on the validating, wherein recipients that were not validated as being authorized to view the new post are not permitted viewing of the new post.

19. The database system of claim 18 wherein the stored instructions, in response to execution by the processing system, are further operable to:
   detect addition of a topic in the second field of the first screen display as one of the recipients of the post; and
   update the summary of recipients in the first field to include display of the topic name, and including in the display an indication that followers of the topic will have access to the post.

20. The database system of claim 18 wherein the stored instructions, in response to execution by the processing system, are further operable to:
   detect addition of a group name in the second field of the first screen display as one of the recipients of the post; and
   update the summary of recipients in the first field to include display of the group name, and including in the display an indication that members of the group will have access to the post.

* * * * *